US012719621B2

(12) United States Patent
Li et al.

(10) Patent No.: US 12,719,621 B2
(45) Date of Patent: Aug. 25, 2026

(54) TYPE-1 HARQ-ACK CODEBOOK GENERATION FOR MULTI-PDSCH SCHEDULING

(71) Applicant: Intel Corporation, Santa Clara, CA (US)

(72) Inventors: Yingyang Li, Beijing (CN); Daewon Lee, Portland, OR (US); Gang Xiong, Beaverton, OR (US); Debdeep Chatterjee, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 246 days.

(21) Appl. No.: 18/279,527

(22) PCT Filed: Apr. 15, 2022

(86) PCT No.: PCT/US2022/024994
§ 371 (c)(1),
(2) Date: Aug. 30, 2023

(87) PCT Pub. No.: WO2022/221647
PCT Pub. Date: Oct. 20, 2022

(65) Prior Publication Data

US 2024/0163026 A1 May 16, 2024

Related U.S. Application Data

(60) Provisional application No. 63/217,459, filed on Jul. 1, 2021, provisional application No. 63/186,548, filed
(Continued)

(51) Int. Cl.
*H04L 1/1829* (2023.01)

(52) U.S. Cl.
CPC .......... *H04L 1/1861* (2013.01); *H04L 1/1864* (2013.01)

(58) Field of Classification Search
CPC ... H04L 1/1861; H04L 1/1864; H04L 1/1854; H04L 1/1896; H04L 5/0044;
(Continued)

(56) References Cited

U.S. PATENT DOCUMENTS

2019/0312713 A1* 10/2019 Yang ..................... H04W 72/23
2020/0214084 A1* 7/2020 Panteleev ............. H04W 76/27
(Continued)

FOREIGN PATENT DOCUMENTS

JP 7729908 8/2025
WO WO-2022221647 A1 10/2022

OTHER PUBLICATIONS

"Japanese Application Serial No. 2023-560785, Final Notification of Reasons for Rejection mailed Apr. 1, 2025", W English Translation, 6 pgs.
(Continued)

*Primary Examiner* — Rina C Pancholi
(74) *Attorney, Agent, or Firm* — Schwegman Lundberg & Woessner, P.A.

(57) ABSTRACT

A user equipment (UE) configured for operation in a 5th generation (5G) new radio (NR) system (5GS) (5G NR) in which a multi-transmission time interval (TTI) DCI schedules multiple physical downlink shared channels (PDSCHs), generates a Type-1 HARQ-ACK codebook for candidate PDSCH reception occasions corresponding to an uplink slot. The UE determines a set of downlink (DE) slots for the multiple scheduled PDSCHs and a set of a Start and Length Indicator Values (SLIVs) for the DE slots based on configured slot timing values (K1) and a configured time domain resource allocation (TDRA) table.

13 Claims, 13 Drawing Sheets

Related U.S. Application Data on May 10, 2021, provisional application No. 63/186,640, filed on May 10, 2021, provisional application No. 63/185,256, filed on May 6, 2021, provisional application No. 63/176,026, filed on Apr. 16, 2021.

(58) Field of Classification Search
CPC ............... H04L 5/0094; H04L 27/2602; H04L 27/26025; H04W 72/23
See application file for complete search history.

(56) References Cited

U.S. PATENT DOCUMENTS

| | | | | |
|---|---|---|---|---|
| 2022/0240289 | A1* | 7/2022 | Karaki | H04L 1/1896 |
| 2022/0322404 | A1* | 10/2022 | Kwak | H04W 72/1263 |
| 2023/0209530 | A1* | 6/2023 | Rastegardoost | H04L 1/1854 370/329 |
| 2023/0371039 | A1* | 11/2023 | Tsai | H04W 72/232 |
| 2023/0396371 | A1* | 12/2023 | Blankenship | H04L 5/0053 |

OTHER PUBLICATIONS

"Japanese Application Serial No. 2023-560785, Response filed Jul. 1, 2025 to Final Notification of Reasons for Rejection mailed Apr. 1, 2025", W English Claims, 20 pgs.
"Discussion on PDSCH/PUSCH enhancements for above 52.6 GHz", Apple Inc., R1-2103100, 3GPP TSG RAN WG1 #104b-e, e-Meeting, (Apr. 7, 2021), 19 pgs.
"Discussion on PDSCH/PUSCH enhancements for extending NR up to 71 GHz", Intel Corporation, R1-2103025, 3GPP TSG RAN WG1 #104b-e, e-Meeting, (Apr. 7, 2021), 17 pgs.
"International Application Serial No. PCT/US2022/024994, International Search Report mailed Jul. 26, 2022", 3 pgs.
"International Application Serial No. PCT/US2022/024994, Written Opinion mailed Jul. 26, 2022", 5 pgs.
"PDSCH/PUSCH enhancements for NR from 52.6 GHz to 71 GHz", Samsung, R1-2103233, 3GPP TSG RAN WG1 #104b-e, e-Meeting, (Apr. 7, 2021), 16 pgs.
"PDSCH/PUSCH enhancements to support NR above 52.6 GHz", LG Electronics, R1-2103343, 3GPP TSG RAN WG1 #104b-e, e-Meeting, (Apr. 7, 2021), 18 pgs.
"International Application Serial No. PCT US2022 024994, International Preliminary Report on Patentability mailed Oct. 26, 2023", 7 pgs.
"Japanese Application Serial No. 2023-560785, Voluntary Amendment filed Dec. 27, 2023", 59 pgs.
"European Application Serial No. 22789002.7, Response to Communication pursuant to Rules 161(1) and 162 EPC filed May 23, 2024", 18 pgs.
"Japanese Application Serial No. 2023-560785, Notification of Reasons for Refusal mailed Dec. 3, 2024", w English Translation, 7 pgs.
"European Application Serial No. 22789002.7, Extended European Search Report mailed Feb. 11, 2025", 10 pgs.
"Japanese Application Serial No. 2023-560785, Response filed Feb. 28, 2025 to Notification of Reasons for Refusal mailed Dec. 3, 2024", W English Claims, 15 pgs.
Moderator, "Summary #1 of PDSCH PUSCH enhancements (Scheduling HARQ)", 3gpp Draft; R1-2103344, 3rd Generation Partnership-project (3GPP), Mobile Competence Centre ; 650, Route Des Lucioles ; F-06921 Sophia-Antipolis Cedex ; France J vol. Ran Wg1, No.E-Meeting;, [Online]. Retrieved from the Internet: URL:https: ftp.3gpp.org tsg_ran WG1_RL1 TSGR1_104b-e Inbox R12103344.zip R1-2103344.docx, (Apr. 15, 2021), Apr. 12, 2021-Apr. 20, 2021.
Xiaomi, "PDSCH PUSCH enhancements for NR 52.6-71 Ghz", 3gpp Draft; R1-2102980, 3rd Generation Partnership Project (3GPP), Mobile Competence Centre ; 650, Route Des Lucioles ; F-06921 Sophia-Antipolis Cedex ; France vol. RAN WG1, No. e-Meeting, [Online]. Retrieved from the Internet: URL:https: ftp.3gpp.org tsg_ran WG1_RL1 TSGR1_104be Docs R12102980.zipR12102980PDSCHandPUSCHenhancements for NR52.6-71GHz.doc, (Apr. 6, 2021), Apr. 12, 2021-Apr. 20, 2021.
"European Application Serial No. 22789002.7, Response filed Aug. 26, 2025 to Extended European Search Report mailed Feb. 11, 2025", W English Claims, 18 pgs.

* cited by examiner

2 ROWS IN TDRA TABLE

K1=3
K1=2
n−5 n−4 n−3 n−2 n−1 SLOT n
0−0 0−1 0−2 PAIR ($d_{1,0}$,0)
1−0 1−1 PAIR ($d_{1,0}$,1)
GROUP 1
GROUP 2
0−0 0−1 0−2 PAIR ($d_{0,0}$,0)
1−0 1−1 PAIR ($d_{0,0}$,1)

TYPE-1 HARQ-ACK CODEBOOK GENERATION FOR MULTI-PDSCH SCHEDULING

PRIORITY CLAIM

This application is a U.S. National Stage Filing under 35 U.S.C. 371 from International Application No. PCT/US2022/024994, filed Apr. 15, 2022 and published in English as WO 2022/221647 on Oct. 20, 2022, which claims priority to: U.S. Provisional Patent Application Ser. No. 63/176,026, filed Apr. 16, 2021, U.S. Provisional Patent Application Ser. No. 63/185,256, filed May 6, 2021, U.S. Provisional Patent Application Ser. No. 63/186,548, filed May 10, 2021, U.S. Provisional Patent Application Ser. No. 63/186,640, filed May 10, 2021, U.S. Provisional Patent Application Ser. No. 63/217,459, filed Jul. 1, 2021, which are incorporated herein by reference in their entireties.

TECHNICAL FIELD

Embodiments pertain to wireless communications. Some embodiments relate to wireless networks including 3GPP (Third Generation Partnership Project) and fifth-generation (5G) networks including 5G new radio (NR) (or 5G-NR) networks. Some embodiments relate to sixth-generation (6G) networks. Some embodiments relate to multi-transmission time interval (TTI) scheduling of physical downlink shared channels (PDSCHs). Some embodiments relate to Hybrid Automatic Repeat Request (HARQ) Acknowledgement (ACK) codebook generation.

BACKGROUND

Mobile communication has evolved significantly from early voice systems to today's highly sophisticated integrated communication platform. The next generation wireless communication system, 5G, or new radio (NR) will provide access to information and sharing of data anywhere, anytime by various users and applications. NR is expected to be a unified network/system that target to meet vastly different and sometime conflicting performance dimensions and services. Such diverse multi-dimensional requirements are driven by different services and applications. In general, NR will evolve based on 3GPP LTE-Advanced with additional potential new Radio Access Technologies (RATs) to enrich people lives with better, simple and seamless wireless connectivity solutions. NR will enable everything connected by wireless and deliver fast, rich contents and services.

On issue with 5G NR systems is HARQ-based PSDCH transmissions, particularly for higher-carrier frequency operations (i.e., carrier frequencies above 52.6 GHz) since larger subcarrier spacings (SCSs) are used with a shorter slot duration.

DETAILED DESCRIPTION

Figure 1A:
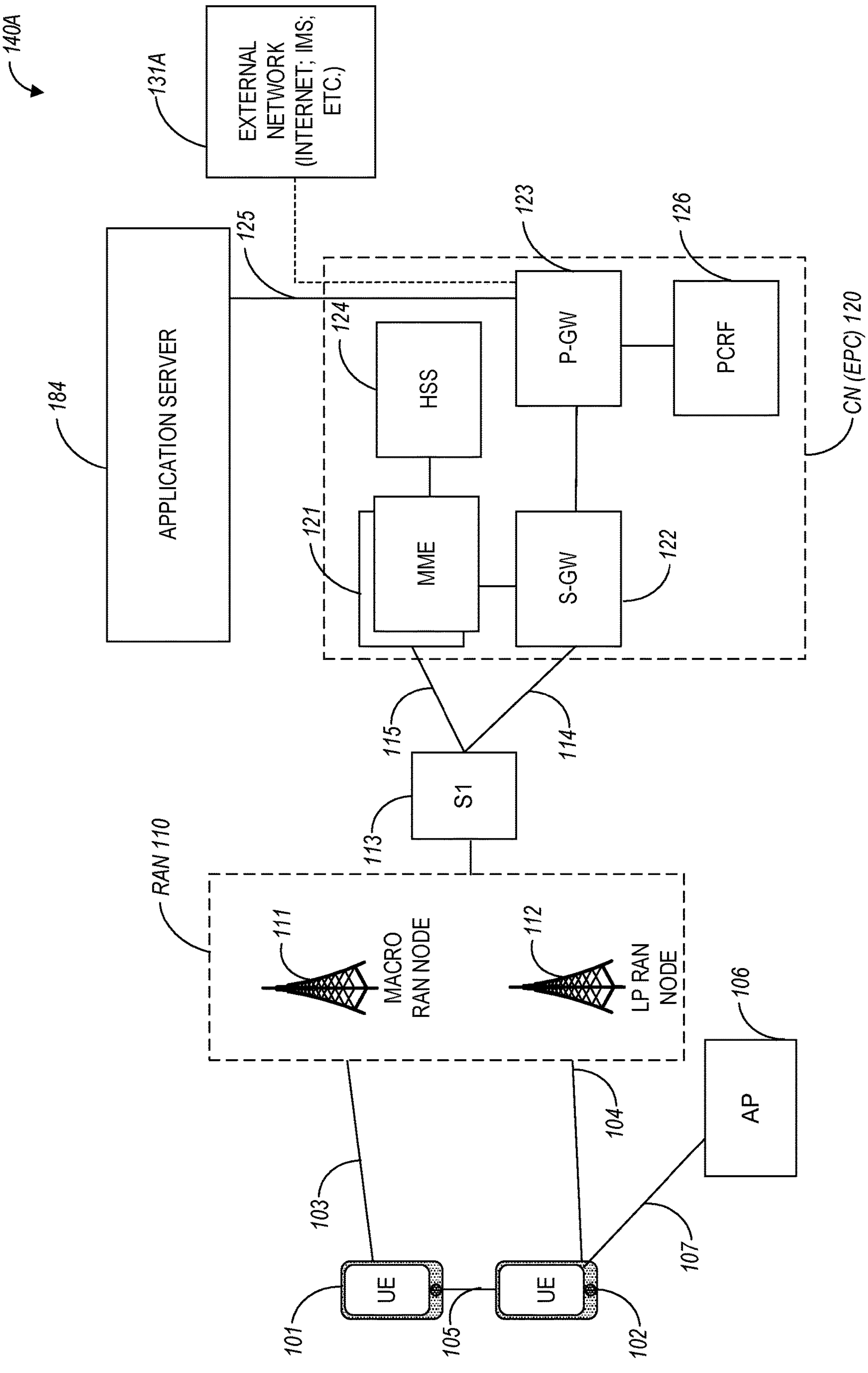
FIG. 1A illustrates an architecture of a network, in accordance with some embodiments.

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Some embodiments are directed to hybrid-automatic repeat request (HARQ) based PDSCH transmission. Some embodiments are related to multi-transmission time interval (TTI) scheduling of multiple physical downlink shared channels (PDSCHs). Some embodiments are directed to Type-1 hybrid-automatic repeat request acknowledgement (HARQ-ACK) codebook generation. These embodiments are described in more detail below.

Some embodiments are direct to a user equipment (UE) configured for operation in a $5^{th}$ generation (5G) new radio (NR) system (5GS) (5G NR). In these embodiments, the UE may be configured to detect a downlink control information (DCI) format. When the DCI format is a multi-transmission time interval (TTI) DCI scheduling multiple physical downlink shared channels (PDSCHs), the UE may determine a set of downlink (DL) slots for the multiple scheduled PDSCHs and a set of a Start and Length Indicator Values (SLIV) for the DL slots based on configured slot timing values (K1) and a configured time domain resource allocation (TDRA) table. The UE may also determine candidate PDSCH reception occasions corresponding to an uplink slot for a HARQ-ACK. The UE may also encode the HARQ-ACK for transmission in the uplink slot. In these embodiments, the HARQ-ACK may comprise a Type-1 HARQ-ACK codebook generated based all the DL slots of the set of DL slots and the set of SLIVs for the DL slots. These embodiments are described in more detail below.

In these embodiments, the UE may be configured for HARQ based PDSCH transmission. In these embodiments, the candidate PDSCH reception occasions correspond to a position in the HARQ-ACK codebook to transmit HARQ-ACK feedback for the related potential PDSCH(s). In these embodiments, for each DL slot, one or more candidate PDSCH reception occasions may be determined, although the scope of the embodiments is not limited in this respect.

In some embodiments, the UE is configured to detect the multi-TTI DCI when operating at subcarrier spacings (SCS) of 120 kHz, 480 kHz and 960 kHz with shorter slot durations (i.e., at higher-carrier frequencies (i.e., carrier frequencies above 52.6 GHz)). In these embodiments, a gNodeB (gNB) does not configure the UE with a multi-TTI DCI when operating at lower subcarrier spacings (i.e., 60 kHz). In these embodiments, multiple PDSCHs/PUSCHs may be scheduled by a single DCI. This avoids the need for UE to monitor every slot for a PDCCH scheduling PDSCH/PUSCH since it may not be feasible for the UE to monitor and decode due to very short slot duration for higher SCS values such as 480 kHz and 960 kHz. In these embodiments, when the UE is configured with a multi-slot PDCCH monitoring span, the UE is not required to monitor every slot for a physical downlink control channel (PDCCH), although the scope of the embodiments is not limited in this respect.

In some embodiments, to determine the DL slots for the set, the processing circuitry is to consider all combinations of the configured slot timing values (K1) and the SLIVs of all rows of the configured TDRA table. In some embodiments, the UE may be configured to decode one or more PDSCHs in the DL slots of the set to generate the Type-1 HARQ-ACK codebook, although the scope of the embodiments is not limited in this respect.

In some embodiments, the configured slot timing values (K1) are received in the DCI format and the SLIVs indicate a start symbol and a number of consecutive symbols within DL slots of the set. In these embodiments, a SLIV is the Start and Length Indicator for a time domain resource allocation for a PDSCH that defines start symbol and number of consecutive symbols for PDSCH allocation (e.g., see TS 38.214), although the scope of the embodiments is not limited in this respect.

In some embodiments, to determine a set of SLIVs for a DL slot, the processing circuitry is to include a SLIV of a row in the TDRA table if the SLIV can be scheduled with one of the configured slot timing values (K1) so that the SLIV is mapped to the DL slot. In some embodiments, the UE may be configured to exclude a SLIV, from the set of SLIVs, for a DL slot, if the SLIV overlaps with an uplink (UL) symbol in the DL slot (i.e., according to the semi-static TDD UL-DL configuration), although the scope of the embodiments is not limited in this respect.

In some embodiments, the candidate PDSCH reception occasions for a DL slot of the set are determined from the set of SLIVs for the DL slot. In these embodiments, the candidate PDSCH reception occasions may correspond to positions in the HARQ-ACK codebook, although the scope of the embodiments is not limited in this respect.

In some embodiments, the UE may determine a single (i.e., only one) candidate PDSCH reception occasion for a DL slot if the set of SLIVs for the DL slot includes at least one SLIV that is not overlapping with an UL symbol in the DL slot according to a semi-static TDD UL-DL configuration. In these embodiments, only one candidate PDSCH reception occasion is determined for a DL slot. In these embodiments, the TDD configuration may be semi-statically signaled to the UE by the gNB, although the scope of the embodiments is not limited in this respect.

In some embodiments, each of the scheduled PDSCH transmissions are scheduled by the DCI format to have one or more transport blocks (TBs) in different DL slots, although the scope of the embodiments is not limited in this respect.

In some of these embodiments, the Type 1 codebook may be a fixed size Codebook provided by the gNB via RRC Signaling (Semi static). A Type 2 Codebook may have a dynamic size and may change according to resource allocation (Dynamic), although the scope of the embodiments is not limited in this respect. In some embodiments, the processing circuitry may comprise a baseband processor, although the scope of the embodiments is not limited in this respect.

Some embodiments are directed to a non-transitory computer-readable storage medium that stores instructions for execution by processing circuitry of a user equipment (UE) configured for operation in a $5^{th}$ generation (5G) new radio (NR) system (5GS) (5G NR). In these embodiments, the processing circuitry may be configured to detect a downlink control information (DCI) format. When the DCI format is a multi-transmission time interval (TTI) DCI scheduling multiple physical downlink shared channels (PDSCHs), the processing circuitry may determine a set of downlink (DL) slots for the multiple scheduled PDSCHs and a set of a Start and Length Indicator Values (SLIV) for the DL slots based on configured slot timing values (K1) and a configured time domain resource allocation (TDRA) table. The processing circuitry may also determine candidate PDSCH reception occasions corresponding to an uplink slot for a HARQ-ACK. The processing circuitry may also encode the HARQ-ACK for transmission in the uplink slot. In these embodiments, the HARQ-ACK may comprise a Type-1 HARQ-ACK codebook generated based all the DL slots of the set of DL slots and the set of SLIVs for the DL slots. These embodiments are described in more detail below.

Some embodiments are directed to a gNodeB (gNB) configured for operation in a $5^{th}$ generation (5G) new radio (NR) system (5GS) (5G NR). In these embodiments, the gNB may encode a downlink control information (DCI) format for transmission to a user equipment (UE). For operations at subcarrier spacings (SCS) of 120 kHz, 480 kHz and 960 kHz, the DCI format may be encoded as a multi-transmission time interval (TTI) DCI scheduling multiple physical downlink shared channels (PDSCHs). In these embodiments, the gNB may encode multiple scheduled PDSCHs for transmission to the UE in accordance with the DCI format. The gNB may also decode a HARQ-ACK in an uplink slot from the UE. The HARQ-ACK may comprise a Type-1 HARQ-ACK codebook generated by the UE based on downlink (DL) slots of a set of DL slots for the multiple scheduled PDSCHs and a set of Start and Length Indicator Values (SLIVs) for each of the DL slots. In these embodiments, the set of DL slots and the SLIVs for the DL slots may be based on configured slot timing values (K1) and a configured time domain resource allocation (TDRA) table. In these embodiments, candidate PDSCH reception occasions correspond to the uplink slot correspond to positions in the HARQ-ACK codebook. These embodiments are described in more detail below.

FIG. 1A illustrates an architecture of a network in accordance with some embodiments. The network 140A is shown to include user equipment (UE) 101 and UE 102. The UEs 101 and 102 are illustrated as smartphones (e.g., handheld touchscreen mobile computing devices connectable to one or more cellular networks) but may also include any mobile or non-mobile computing device, such as Personal Data Assistants (PDAs), pagers, laptop computers, desktop computers, wireless handsets, drones, or any other computing device including a wired and/or wireless communications interface. The UEs 101 and 102 can be collectively referred to herein as UE 101, and UE 101 can be used to perform one or more of the techniques disclosed herein.

Any of the radio links described herein (e.g., as used in the network 140A or any other illustrated network) may operate according to any exemplary radio communication technology and/or standard.

LTE and LTE-Advanced are standards for wireless communications of high-speed data for UE such as mobile telephones. In LTE-Advanced and various wireless systems, carrier aggregation is a technology according to which multiple carrier signals operating on different frequencies may be used to carry communications for a single UE, thus increasing the bandwidth available to a single device. In some embodiments, carrier aggregation may be used where one or more component carriers operate on unlicensed frequencies.

Embodiments described herein can be used in the context of any spectrum management scheme including, for example, dedicated licensed spectrum, unlicensed spectrum, (licensed) shared spectrum (such as Licensed Shared Access (LSA) in 2.3-2.4 GHz, 3.4-3.6 GHz, 3.6-3.8 GHz, and further frequencies and Spectrum Access System (SAS) in 3.55-3.7 GHz and further frequencies).

Embodiments described herein can also be applied to different Single Carrier or OFDM flavors (CP-OFDM, SC-FDMA, SC-OFDM, filter bank-based multicarrier (FBMC), OFDMA, etc.) and in particular 3GPP NR (New Radio) by allocating the OFDM carrier data bit vectors to the corresponding symbol resources.

In some embodiments, any of the UEs 101 and 102 can comprise an Internet-of-Things (IoT) UE or a Cellular IoT (CIoT) UE, which can comprise a network access layer designed for low-power IoT applications utilizing short-lived UE connections. In some embodiments, any of the UEs 101 and 102 can include a narrowband (NB) IoT UE (e.g., such as an enhanced NB-IoT (eNB-IoT) UE and Further Enhanced (FeNB-IoT) UE). An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network includes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

In some embodiments, any of the UEs 101 and 102 can include enhanced MTC (eMTC) UEs or further enhanced MTC (FeMTC) UEs.

The UEs 101 and 102 may be configured to connect, e.g., communicatively couple, with a radio access network (RAN) 110. The RAN 110 may be, for example, an Evolved Universal Mobile Telecommunications System (UMTS) Terrestrial Radio Access Network (E-UTRAN), a NextGen RAN (NG RAN), or some other type of RAN. The UEs 101 and 102 utilize connections 103 and 104, respectively, each of which comprises a physical communications interface or layer (discussed in further detail below); in this example, the connections 103 and 104 are illustrated as an air interface to enable communicative coupling and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth-generation (5G) protocol, a New Radio (NR) protocol, and the like.

In an aspect, the UEs 101 and 102 may further directly exchange communication data via a ProSe interface 105. The ProSe interface 105 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 102 is shown to be configured to access an access point (AP) 106 via connection 107. The connection 107 can comprise a local wireless connection, such as, for example, a connection consistent with any IEEE 802.11 protocol, according to which the AP 106 can comprise a wireless fidelity (WiFi) router. In this example, the AP 106 is shown to be connected to the Internet without connecting to the core network of the wireless system (described in further detail below).

The RAN 110 can include one or more access nodes that enable the connections 103 and 104. These access nodes (ANs) can be referred to as base stations (BSs), NodeBs, evolved NodeBs (eNBs), Next Generation NodeBs (gNBs), RAN nodes, and the like, and can comprise ground stations (e.g., terrestrial access points) or satellite stations providing coverage within a geographic area (e.g., a cell). In some embodiments, the communication nodes 111 and 112 can be transmission/reception points (TRPs). In instances when the communication nodes 111 and 112 are NodeBs (e.g., eNBs or gNBs), one or more TRPs can function within the communication cell of the NodeBs. The RAN 110 may include one or more RAN nodes for providing macrocells, e.g., macro-RAN node 111, and one or more RAN nodes for providing femtocells or picocells (e.g., cells having smaller coverage areas, smaller user capacity, or higher bandwidth compared to macrocells), e.g., low power (LP) RAN node 112.

Any of the RAN nodes 111 and 112 can terminate the air interface protocol and can be the first point of contact for the UEs 101 and 102. In some embodiments, any of the RAN nodes 111 and 112 can fulfill various logical functions for the RAN 110 including, but not limited to, radio network controller (RNC) functions such as radio bearer management, uplink and downlink dynamic radio resource management and data packet scheduling, and mobility management. In an example, any of the nodes 111 and/or 112 can be a new generation Node-B (gNB), an evolved node-B (eNB), or another type of RAN node.

The RAN 110 is shown to be communicatively coupled to a core network (CN) 120 via an S1 interface 113. In embodiments, the CN 120 may be an evolved packet core (EPC) network, a NextGen Packet Core (NPC) network, or some other type of CN (e.g., as illustrated in reference to FIGS. 1B-1C). In this aspect, the S1 interface 113 is split into two parts: the S1-U interface 114, which carries traffic data between the RAN nodes *11l* and 112 and the serving gateway (S-GW) 122, and the S1-mobility management entity (MME) interface 115, which is a signaling interface between the RAN nodes 111 and 112 and MMEs 121.

In this aspect, the CN 120 comprises the MMEs 121, the S-GW 122, the Packet Data Network (PDN) Gateway (P-GW) 123, and a home subscriber server (HSS) 124. The MMEs 121 may be similar in function to the control plane of legacy Serving General Packet Radio Service (GPRS) Support Nodes (SGSN). The MMEs 121 may manage mobility embodiments in access such as gateway selection and tracking area list management. The HSS 124 may comprise a database for network users, including subscription-related information to support the network entities' handling of communication sessions. The CN 120 may comprise one or several HSSs 124, depending on the number of mobile subscribers, on the capacity of the equipment, on the organization of the network, etc. For example, the HSS 124 can provide support for routing/roaming, authentication, authorization, naming/addressing resolution, location dependencies, etc.

The S-GW 122 may terminate the S1 interface 113 towards the RAN 110, and routes data packets between the RAN 110 and the CN 120. In addition, the S-GW 122 may be a local mobility anchor point for inter-RAN node handovers and also may provide an anchor for inter-3GPP mobility. Other responsibilities of the S-GW 122 may include a lawful intercept, charging, and some policy enforcement.

The P-GW 123 may terminate an SGi interface toward a PDN. The P-GW 123 may route data packets between the EPC network 120 and external networks such as a network including the application server 184 (alternatively referred to as application function (AF)) via an Internet Protocol (IP) interface 125. The P-GW 123 can also communicate data to other external networks 131A, which can include the Internet, IP multimedia subsystem (IPS) network, and other networks. Generally, the application server 184 may be an element offering applications that use IP bearer resources with the core network (e.g., UMTS Packet Services (PS) domain, LTE PS data services, etc.). In this aspect, the P-GW 123 is shown to be communicatively coupled to an application server 184 via an IP interface 125. The application server 184 can also be configured to support one or more communication services (e.g., Voice-over-Internet Protocol (VoIP) sessions, PTT sessions, group communication sessions, social networking services, etc.) for the UEs 101 and 102 via the CN 120.

The P-GW 123 may further be a node for policy enforcement and charging data collection. Policy and Charging Rules Function (PCRF) 126 is the policy and charging control element of the CN 120. In a non-roaming scenario, in some embodiments, there may be a single PCRF in the Home Public Land Mobile Network (HPLMN) associated with a UE's Internet Protocol Connectivity Access Network (IP-CAN) session. In a roaming scenario with a local breakout of traffic, there may be two PCRFs associated with a UE's IP-CAN session: a Home PCRF (H-PCRF) within an HPLMN and a Visited PCRF (V-PCRF) within a Visited Public Land Mobile Network (VPLMN). The PCRF 126 may be communicatively coupled to the application server 184 via the P-GW 123.

In some embodiments, the communication network 140A can be an IoT network or a 5G network, including 5G new radio network using communications in the licensed (5G NR) and the unlicensed (5G NR-U) spectrum. One of the current enablers of IoT is the narrowband-IoT (NB-IoT).

An NG system architecture can include the RAN 110 and a 5G network core (5GC) 120. The NG-RAN 110 can include a plurality of nodes, such as gNBs and NG-eNBs. The core network 120 (e.g., a 5G core network or 5GC) can include an access and mobility function (AMF) and/or a user plane function (UPF). The AMF and the UPF can be communicatively coupled to the gNBs and the NG-eNBs via NG interfaces. More specifically, in some embodiments, the gNBs and the NG-eNBs can be connected to the AMF by NG-C interfaces, and to the UPF by NG-U interfaces. The gNBs and the NG-eNBs can be coupled to each other via Xn interfaces.

In some embodiments, the NG system architecture can use reference points between various nodes as provided by 3GPP Technical Specification (TS) 23.501 (e.g., V15.4.0, 2018 December). In some embodiments, each of the gNBs and the NG-eNBs can be implemented as a base station, a mobile edge server, a small cell, a home eNB, and so forth. In some embodiments, a gNB can be a master node (MN) and NG-eNB can be a secondary node (SN) in a 5G architecture.

Figure 1B:
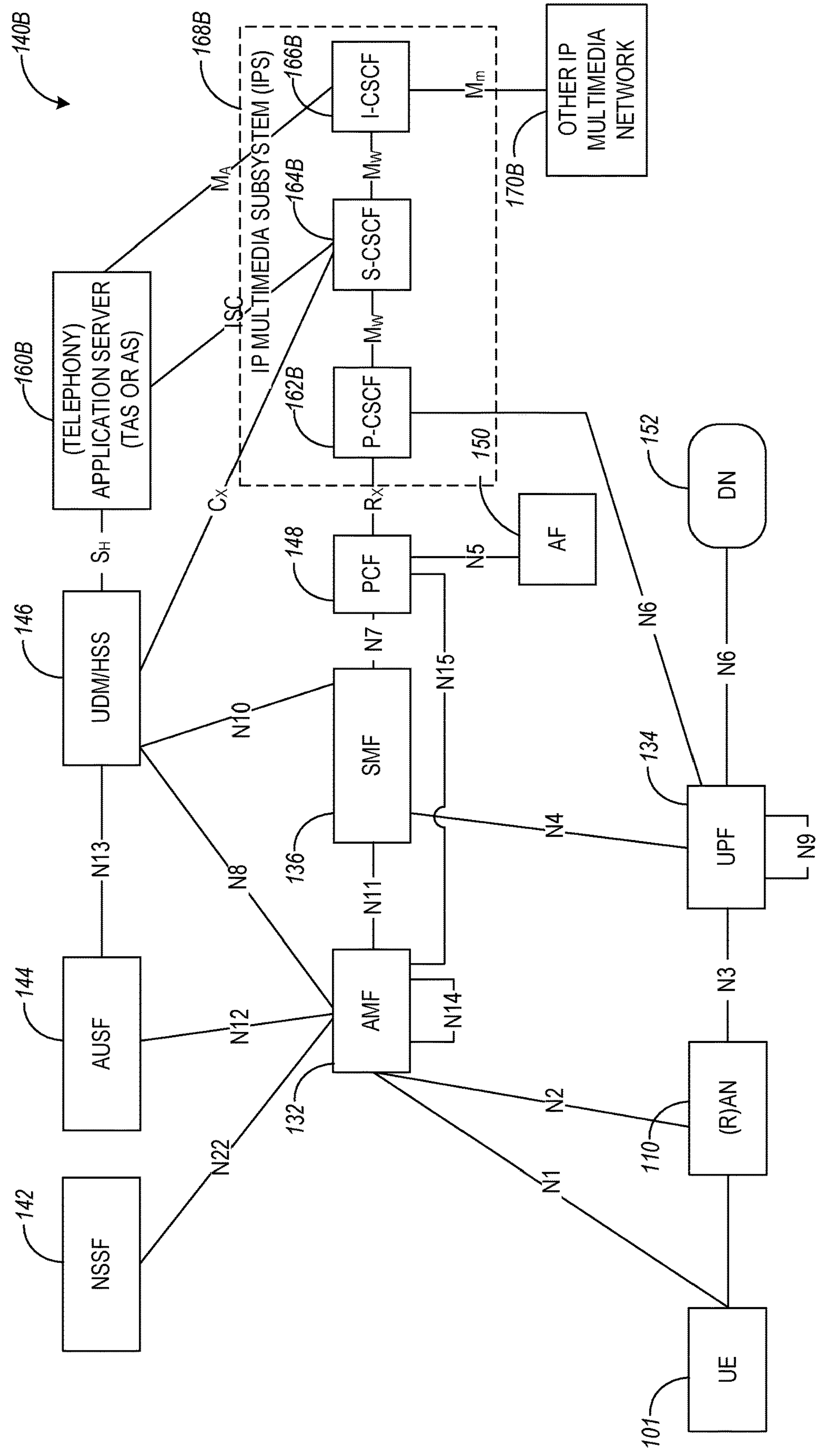
FIG. 1B and FIG. 1C illustrate a non-roaming 5G system architecture in accordance with some embodiments.

FIG. 1B illustrates a non-roaming 5G system architecture in accordance with some embodiments. Referring to FIG. 1B, there is illustrated a 5G system architecture 140B in a reference point representation. More specifically, UE 102 can be in communication with RAN 110 as well as one or more other 5G core (5GC) network entities. The 5G system architecture 140B includes a plurality of network functions (NFs), such as access and mobility management function (AMF) 132, session management function (SMF) 136, policy control function (PCF) 148, application function (AF) 150, user plane function (UPF) 134, network slice selection function (NSSF) 142, authentication server function (AUSF) 144, and unified data management (UDM)/home subscriber server (HSS) 146. The UPF 134 can provide a connection to a data network (DN) 152, which can include, for example, operator services, Internet access, or third-party services. The AMF 132 can be used to manage access control and mobility and can also include network slice selection functionality. The SMF 136 can be configured to set up and manage various sessions according to network policy. The UPF 134 can be deployed in one or more configurations according to the desired service type. The PCF 148 can be configured to provide a policy framework using network slicing, mobility management, and roaming (similar to PCRF in a 4G communication system). The UDM can be configured to store subscriber profiles and data (similar to an HSS in a 4G communication system).

In some embodiments, the 5G system architecture 140B includes an IP multimedia subsystem (IMS) 168B as well as a plurality of IP multimedia core network subsystem entities, such as call session control functions (CSCFs). More specifically, the IMS 168B includes a CSCF, which can act as a proxy CSCF (P-CSCF) 162BE, a serving CSCF (S-CSCF) 164B, an emergency CSCF (E-CSCF) (not illustrated in FIG. 1B), or interrogating CSCF (I-CSCF) 166B. The P-CSCF 162B can be configured to be the first contact point for the UE 102 within the IM subsystem (IMS) 168B. The S-CSCF 164B can be configured to handle the session states in the network, and the E-CSCF can be configured to handle certain embodiments of emergency sessions such as routing an emergency request to the correct emergency center or PSAP. The I-CSCF 166B can be configured to function as the contact point within an operator's network for all IMS connections destined to a subscriber of that network operator, or a roaming subscriber currently located within that network operator's service area. In some embodiments, the I-CSCF 166B can be connected to another IP multimedia network 170E, e.g. an IMS operated by a different network operator.

In some embodiments, the UDM/HSS 146 can be coupled to an application server 160E, which can include a telephony application server (TAS) or another application server (AS).

The AS 160B can be coupled to the IMS 168B via the S-CSCF 164B or the I-CSCF 166B.

A reference point representation shows that interaction can exist between corresponding NF services. For example, FIG. 1B illustrates the following reference points: N1 (between the UE 102 and the AMF 132), N2 (between the RAN 110 and the AMF 132), N3 (between the RAN 110 and the UPF 134), N4 (between the SMF 136 and the UPF 134), N5 (between the PCF 148 and the AF 150, not shown), N6 (between the UPF 134 and the DN 152), N7 (between the SMF 136 and the PCF 148, not shown), N8 (between the UDM 146 and the AMF 132, not shown), N9 (between two UPFs 134, not shown), N10 (between the UDM 146 and the SMF 136, not shown), N11 (between the AMF 132 and the SMF 136, not shown), N12 (between the AUSF 144 and the AMF 132, not shown), N13 (between the AUSF 144 and the UDM 146, not shown), N14 (between two AMFs 132, not shown), N15 (between the PCF 148 and the AMF 132 in case of a non-roaming scenario, or between the PCF 148 and a visited network and AMF 132 in case of a roaming scenario, not shown), N16 (between two SMFs, not shown), and N22 (between AMF 132 and NSSF 142, not shown). Other reference point representations not shown in FIG. 1B can also be used.

Figure 1C:
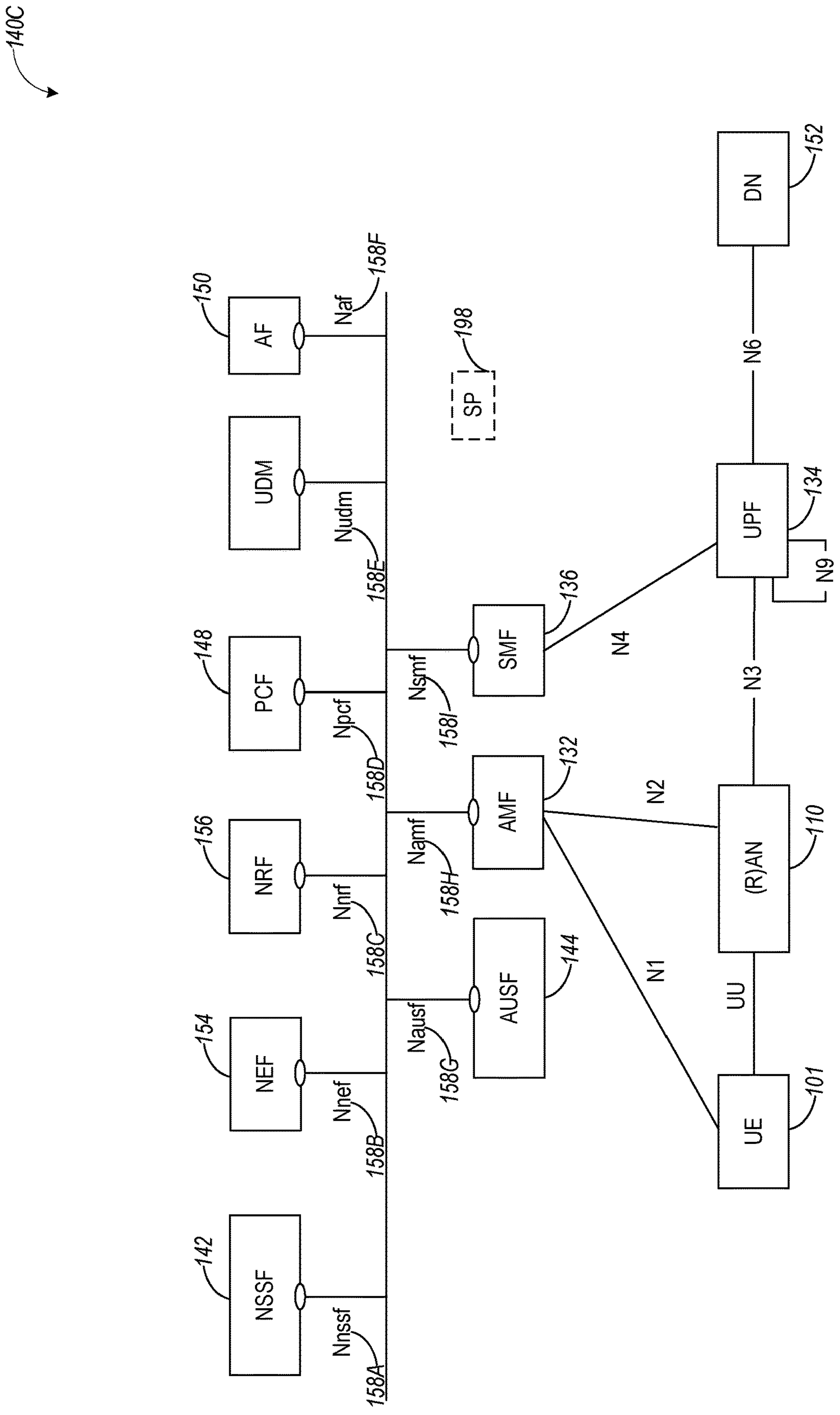

FIG. 1C illustrates a 5G system architecture 140C and a service-based representation. In addition to the network entities illustrated in FIG. 1B, system architecture 140C can also include a network exposure function (NEF) 154 and a network repository function (NRF) 156. In some embodiments, 5G system architectures can be service-based and interaction between network functions can be represented by corresponding point-to-point reference points Ni or as service-based interfaces.

In some embodiments, as illustrated in FIG. 1C, service-based representations can be used to represent network functions within the control plane that enable other authorized network functions to access their services. In this regard, 5G system architecture 140C can include the following service-based interfaces: Namf 158H (a service-based interface exhibited by the AMF 132), Nsmf 1581 (a service-based interface exhibited by the SMF 136), Nnef 158B (a service-based interface exhibited by the NEF 154), Npcf 158D (a service-based interface exhibited by the PCF 148), a Nudm 158E (a service-based interface exhibited by the UDM 146), Naf 158F (a service-based interface exhibited by the AF 150), Nnrf 158C (a service-based interface exhibited by the NRF 156), Nnssf 158A (a service-based interface exhibited by the NSSF 142), Nausf 158G (a service-based interface exhibited by the AUSF 144). Other service-based interfaces (e.g., Nudr, N5g-eir, and Nudsf) not shown in FIG. 1C can also be used.

In some embodiments, any of the UEs or base stations described in connection with FIGS. 1A-1C can be configured to perform the functionalities described herein.

Mobile communication has evolved significantly from early voice systems to today's highly sophisticated integrated communication platform. The next generation wireless communication system, 5G, or new radio (NR) will provide access to information and sharing of data anywhere, anytime by various users and applications. NR is expected to be a unified network/system that targets to meet vastly different and sometimes conflicting performance dimensions and services. Such diverse multi-dimensional requirements are driven by different services and applications. In general, NR will evolve based on 3GPP LTE-Advanced with additional potential new Radio Access Technologies (RATs) to enrich people's lives with better, simple, and seamless wireless connectivity solutions. NR will enable everything connected by wireless and deliver fast, rich content and services.

Rel-15 NR systems are designed to operate on the licensed spectrum. The NR-unlicensed (NR-U), a shorthand notation of the NR-based access to unlicensed spectrum, is a technology that enables the operation of NR systems on the unlicensed spectrum.

Figure 2:
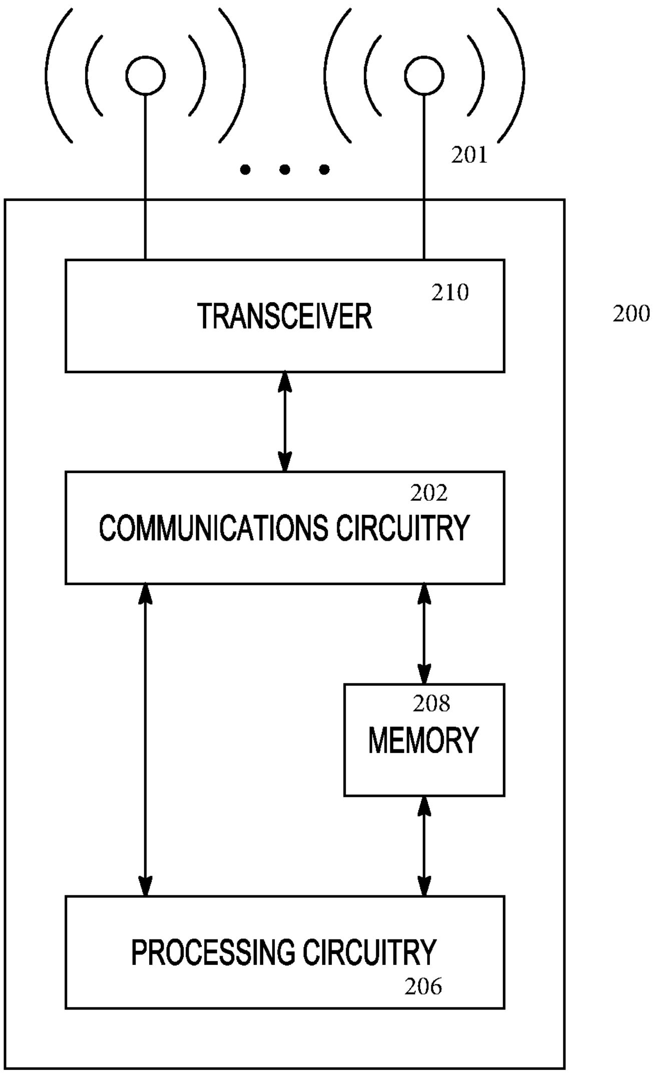
FIG. 2 illustrates a wireless communication device, in accordance with some embodiments.

FIG. 2 illustrates a functional block diagram of a wireless communication device, in accordance with some embodiments. Wireless communication device 200 may be suitable for use as a UE or gNB configured for operation in a 5G NR network. The communication device 200 may include communications circuitry 202 and a transceiver 210 for transmitting and receiving signals to and from other communication devices using one or more antennas 201. The communications circuitry 202 may include circuitry that can operate the physical layer (PHY) communications and/or medium access control (MAC) communications for controlling access to the wireless medium, and/or any other communications layers for transmitting and receiving signals. The communication device 200 may also include processing circuitry 206 and memory 208 arranged to perform the operations described herein. In some embodiments, the communications circuitry 202 and the processing circuitry 206 may be configured to perform operations detailed in the above figures, diagrams, and flows.

In accordance with some embodiments, the communications circuitry 202 may be arranged to contend for a wireless medium and configure frames or packets for communicating over the wireless medium. The communications circuitry 202 may be arranged to transmit and receive signals. The communications circuitry 202 may also include circuitry for modulation/demodulation, upconversion/downconversion, filtering, amplification, etc. In some embodiments, the processing circuitry 206 of the communication device 200 may include one or more processors. In other embodiments, two or more antennas 201 may be coupled to the communications circuitry 202 arranged for sending and receiving signals. The memory 208 may store information for configuring the processing circuitry 206 to perform operations for configuring and transmitting message frames and performing the various operations described herein. The memory 208 may include any type of memory, including non-transitory memory, for storing information in a form readable by a machine (e.g., a computer). For example, the memory 208 may include a computer-readable storage device, read-only memory (ROM), random-access memory (RAM), magnetic disk storage media, optical storage media, flash-memory devices and other storage devices and media.

In some embodiments, the communication device 200 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), a wearable computer device, or another device that may receive and/or transmit information wirelessly.

In some embodiments, the communication device 200 may include one or more antennas 201. The antennas 201 may include one or more directional or omnidirectional antennas, including, for example, dipole antennas, monopole antennas, patch antennas, loop antennas, microstrip antennas, or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, the antennas may be effectively separated for spatial diversity and the different channel characteristics that may result between each of the antennas and the antennas of a transmitting device.

In some embodiments, the communication device 200 may include one or more of a keyboard, a display, a non-volatile memory port, multiple antennas, a graphics processor, an application processor, speakers, and other mobile device elements. The display may be an LCD screen including a touch screen.

Although the communication device 200 is illustrated as having several separate functional elements, two or more of the functional elements may be combined and may be implemented by combinations of software-configured elements, such as processing elements including digital signal processors (DSPs), and/or other hardware elements. For example, some elements may include one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements of the communication device 200 may refer to one or more processes operating on one or more processing elements.

In NR, HARQ based PDSCH transmission is adopted. gNB schedules a PDSCH transmission by transmitting a DCI. The PDSCH transmission carries only one TB if number of MIMO layers is no more than 4. Otherwise, two TBs are transmitted. UE detects the DCI, decode the PDSCH and then report a HARQ-ACK information to gNB. Consequently, gNB may schedule a new TB or a retransmission of the previous TB depending on the HARQ-ACK information from UE.

Figure 3:
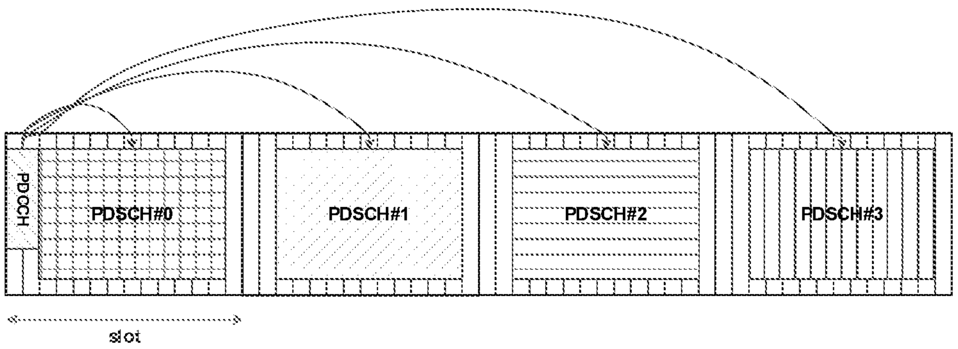
FIG. 3 illustrates multi-transmission time interval (TTI) scheduling for physical downlink shared channels (PDSCHs), in accordance with some embodiments.

For a system operating above 52.6 GHz carrier frequency, the subcarrier spacing, is increased and the slot duration is reduced. A DCI may schedule PDSCH transmissions with one or multiple transport blocks (TBs). FIG. 3 illustrates one example of multi-PDSCH scheduling. In the example, 4 PDSCHs (PDSCH #0-3) with different transport blocks (TB) are scheduled by a single DCI.

Various embodiments herein provide techniques for HARQ-ACK transmission assuming multiple PDSCHs can be scheduled by a DCI. For example, embodiments include techniques for HARQ-ACK transmission when semi-static HARQ-ACK codebook is configured for multi-PDSCH scheduling in system operating above 52.6 GHz carrier frequency.

A DCI may be able to schedule one or more PDSCHs with separate TBs. The number of scheduled PDSCHs by the DCI may be explicitly indicated by a field in the DCI. Alternatively, the number of scheduled PDSCHs by the DCI is jointly coded with other information field(s). For example, the number of scheduled PDSCHs for a row in a time domain resource allocation (TDRA) table equals to the number of configured SLIVs of the row. The maximum number of PDSCHs scheduled by a multi-TTI DCI is the maximum number of scheduled PDSCHs among all rows. For a row of TDRA table, each SLIV can be configured in a different slot. Alternatively, one or more SLIVs may be configured in the same slot.

Type1 HARQ-ACK codebook in NR is generated based on the configured set of slot timing values K1, the configured TDD UL-DL configurations (e.g. TDD-UL-DL-configurationCommon and TDD-UL-DL-configurationDedicated) and the time domain resource allocation (e.g. SLIV) table(s). In Type1 HARQ-ACK codebook, a set of occasions for candidate PDSCH reception are determined. Depending on UE capability, the number of occasions for a slot associated with a value n−K1 is either up to 1 or determined by non-overlapped SLIVs in the slot.

Type1 HARQ-ACK codebook could be extended to support HARQ-ACK feedback for the multiple PDSCHs scheduled by a multi-PDSCH DCI. The PDSCHs indicated by the SLIVs of a row in the TDRA table may be respectively allocated with different occasions of candidate PDSCH receptions in Type1 HARQ-ACK codebook.

Occasions Separately Determined for Each Slot for PDSCH Transmissions

Corresponding to a value $K_{1,k}$ in the set of K1, one or more ending DL slots for the PDSCH transmissions can be determined. For the HARQ-ACK transmission in UL slot $n_U$ and value $K_{1,k}$, PDSCH transmission(s) can be ended in DL slots $\lceil (n_U-K_{1,k})\cdot 2^{\mu_{DL}-\mu_{DL}} \rceil + j$, j=0, 1, . . . , $\lceil 2^{\mu_{DL}-\mu_{DL}} \rceil - 1$. Then, the set of the DL slots that can be used for PDSCH transmissions can be determined by all the determined ending DL slots corresponding to all the values in the set of K1. The occasions for candidate PDSCH receptions can be allocated for each determined DL slot respectively.

For example, if the SCS for PUCCH transmission and the PDSCH transmission is the same, for HARQ-ACK transmission in slot n, for each value $K_{1,k}$ in the set of K1, assuming maximum M PDSCHs can be scheduled by a DCI indicating the value $K_{1,k}$, the M PDSCHs are transmitted in DL slot $n-K_{1,k}-M+1$, $n-K_{1,k}-M+2$, . . . , $n-K_{1,k}$. The set of DL slots for PDSCH transmissions can be generated by including the DL slots determine by each value $K_{1,k}$ in the set of K1. Equivalently, the value $K_{1,k}$ can be considered to be extended to M values, e.g. $K_{1,k}+M-1$, $K_{1,k}+M-2$, . . . , $K_{1,k}$. The extended set of K1 is generated by including the extensions of each value $K_{1,k}$ in the set of K1.

In one embodiment, a superset of SLIVs can be obtained by including all individual SLIVs of all rows in the TDRA table, then occasions of candidate PDSCH receptions in Type1 HARQ-ACK codebook can be generated by the set of DL slots that are determined by the set of K1, the superset of SLIVs and semi-static TDD UL-DL configuration. The procedure for Type1 HARQ-ACK codebook generation in NR can be reused to generate occasions for each determined DL slot assuming the superset of SLIVs.

Figure 4:
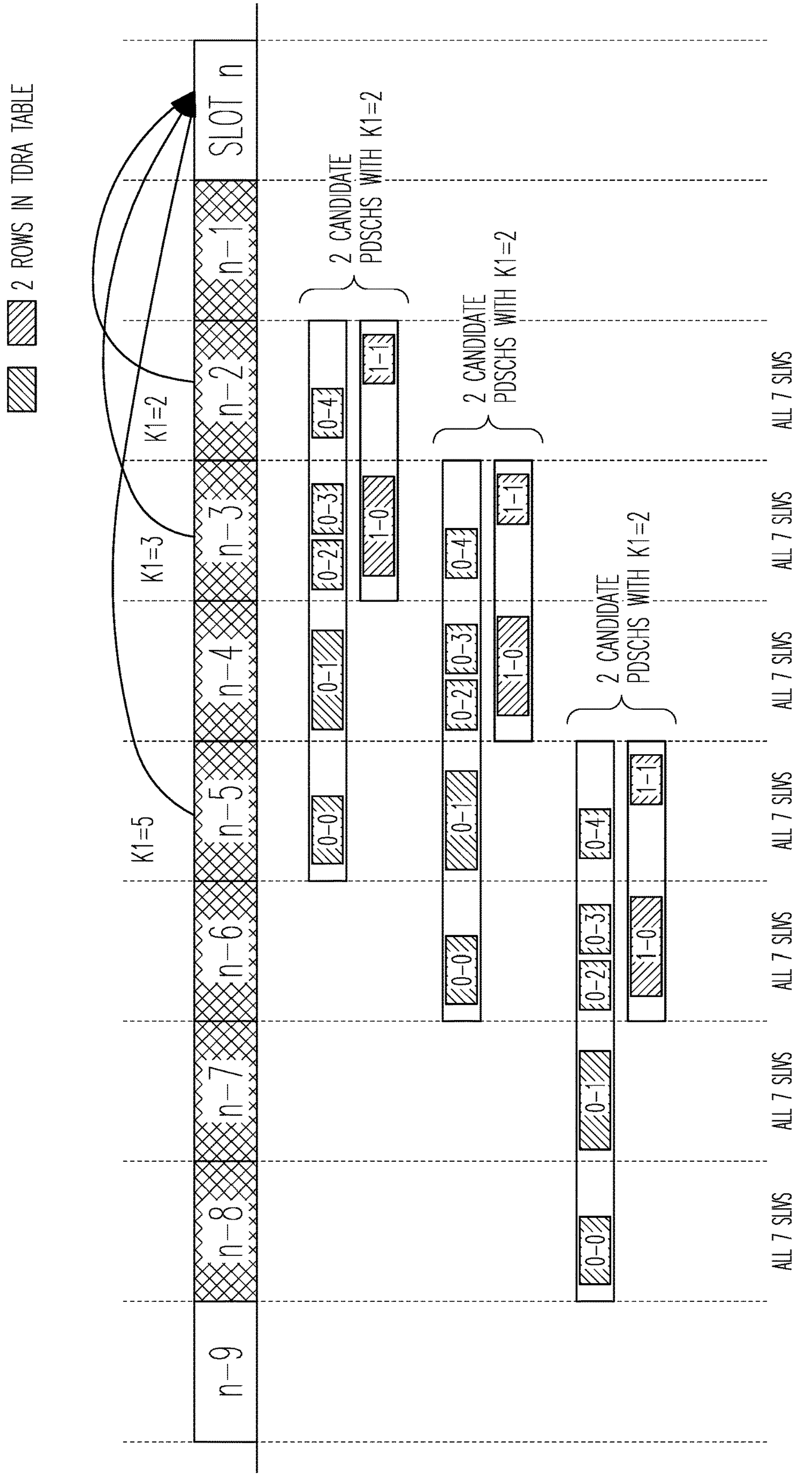
FIG. 4 illustrates occasions generated by checking superset of seven (7) Start and Length Indicator Values (SLIVs), in accordance with some embodiments.

FIG. 4 illustrates one example of the configuration of set of K1 and set of rows in TDRA table. It assumes that the SCS for PUCCH transmission and the PDSCH transmission is the same. In this example, the set of K1 have 3 values 2, 3 and 5. It is assumed the maximum number of PDSCHs scheduled by a DCI is 5. The TDRA table include 2 rows. The first row has 5 SLIVs which are allocated in 4 consecutive slots, e.g. SLIV {0-0, 0-1, 0-2, 0-3, 0-4}. the second row has 2 SLIVs in two consecutive slots, e.g. SLIV {1-0, 1-1}. In FIG. 4, for K1=2, 3, 5, it respectively determines DL slots for PDSCH transmissions {2, 3, 4, 5}, {3, 4, 5, 6} and {5, 6, 7, 8}. Finally, the set of determined DL slots include 7 values, e.g. {2, 3, 4, 5, 6, 7, 8}. Corresponding to HARQ-ACK transmission in slot n, all the possible PDSCH transmissions are in slot n-8 to slot n-2.

In FIG. 4, the superset of SLIVs includes all individual SLIVs of all rows, e.g. 7 SLIVs {0-0, 0-1, 0-2, 0-3, 0-4, 1-0, 1-1}. Type1 HARQ-ACK codebook is generated assuming all determined DL slots and the superset of SLIVs of 7

SLIVs and semi-static TDD UL-DL configuration. In FIG. 4, 2 occasions are allocated for each of the 7 determined DL slots.

In one embodiment, a set of SLIVs can be determined for each DL slot that is determined by the set of K1, then occasions of candidate PDSCH receptions in Type1 HARQ-ACK codebook can be generated by the set of determined DL slots, the corresponding set of SLIVs for each determined DL slot and semi-static TDD UL-DL configuration. The existing procedure for Type1 HARQ-ACK codebook generation in NR can be reused to generate occasions for each DL slot assuming the corresponding set of SLIVs of the DL slot.

For HARQ-ACK transmission in slot n, for a value $K_{1,k}$, the corresponding set of SLIVs for a determined DL slot only include a SLIV of a row, if the SLIV can be scheduled by a DCI with a value $K_{1,i}$ in the set of K1 so that the PDSCH of the SLIV is mapped to the determined DL slot, i may be same or different to k. Alternatively, the corresponding set of SLIVs for a determined DL slot only include a SLIV of a row, if the SLIV can be scheduled by a DCI with a value $K_{1,i}$ in the set of K1 so that the PDSCH of the SLIV can be transmitted in the determined DL slot taking into account the semi-static TDD UL-DL configuration, i may be same or different to k.

Figure 5:
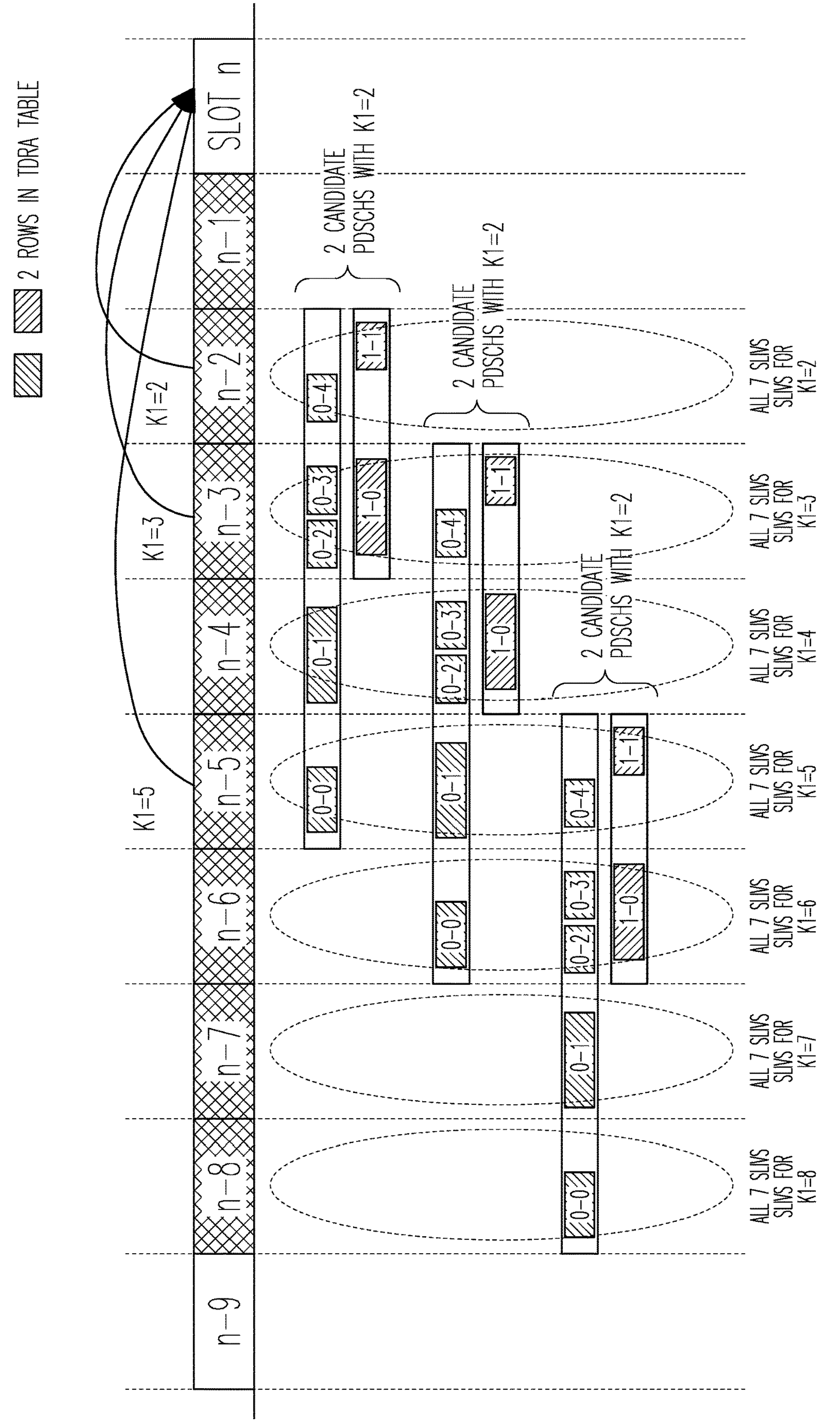
FIG. 5 illustrates occasions generated by checking a respective set of SLIVs, in accordance with some embodiments.

The same assumption as FIG. 4 on set of K1 and TDRA table are used in FIG. 5. The corresponding set of SLIVs for each DL slot that is determined by the set of K1 are:

SLIV {0-0} for DL slot n-8
SLIV {0-1} for DL slot n-7
SLIV {0-0, 0-2, 0-3, 1-0} for DL slot n-6
SLIV {0-0, 0-1, 0-4, 1-1} for DL slot n-5
SLIV {0-1, 0-2, 0-3, 1-0} for DL slot n-4
SLIV {0-2, 0-3, 0-4, 1-0, 1-1} for DL slot n-3
SLIV {0-4, 1-1} for DL slot n-2

Finally, Type1 HARQ-ACK codebook is generated for each determined DL slot using the corresponding set of SLIVs for the DL slot and semi-static TDD UL-DL configuration. In FIG. 5, the number of occasions for each determined DL slots are {1, 1, 2, 2, 2, 2, 2} respectively.

In one embodiment, a set of pairs $(d_{k,j},r)$ can be determined for each DL slot that is determined by a value $K_{1,k}$ in the set of K1, then occasions of candidate PDSCH receptions in Type1 HARQ-ACK codebook can be generated by the set of determined DL slots, the corresponding set of pairs $(d_{k,j},r)$ for each determined DL slot and semi-static TDD UL-DL configuration. A pair $(d_{k,j},r)$ indicates the PDSCH transmissions that can be scheduled by a DCI indicating a valid row r in TDRA table and value $K_{1,k}$ and ends in DL slot $\lfloor (n_U - K_{1,k}) \cdot 2^{\mu_{DL}-\mu_{DL}} \rfloor + j$. For HARQ-ACK transmission in slot $n_U$, the corresponding set of pairs for a determined DL slot only include a pair $(d_{k,j},r)$ only include a row r, if at least one of the PDSCH transmissions that are associated with the pair $(d_{k,j},r)$ is mapped to the determined DL slot, considering the semi-static TDD UL-DL configuration.

In one option, for a determined DL slot, the set of pairs $(d_{k,j},r)$ are divided into one or multiple groups. A pair only belongs to a group. For any two pairs in a group, at least one SLIV of a first pair is overlapped with the SLIV(s) of a second pair. For the determined DL slot, the occasion(s) are allocated for each group of pairs respectively. For a group, the number of allocated occasions equals to the maximum number of SLIV(s) that is available for PDSCH transmission in the determined DL slot among all the pairs in the group.

Figure 6:
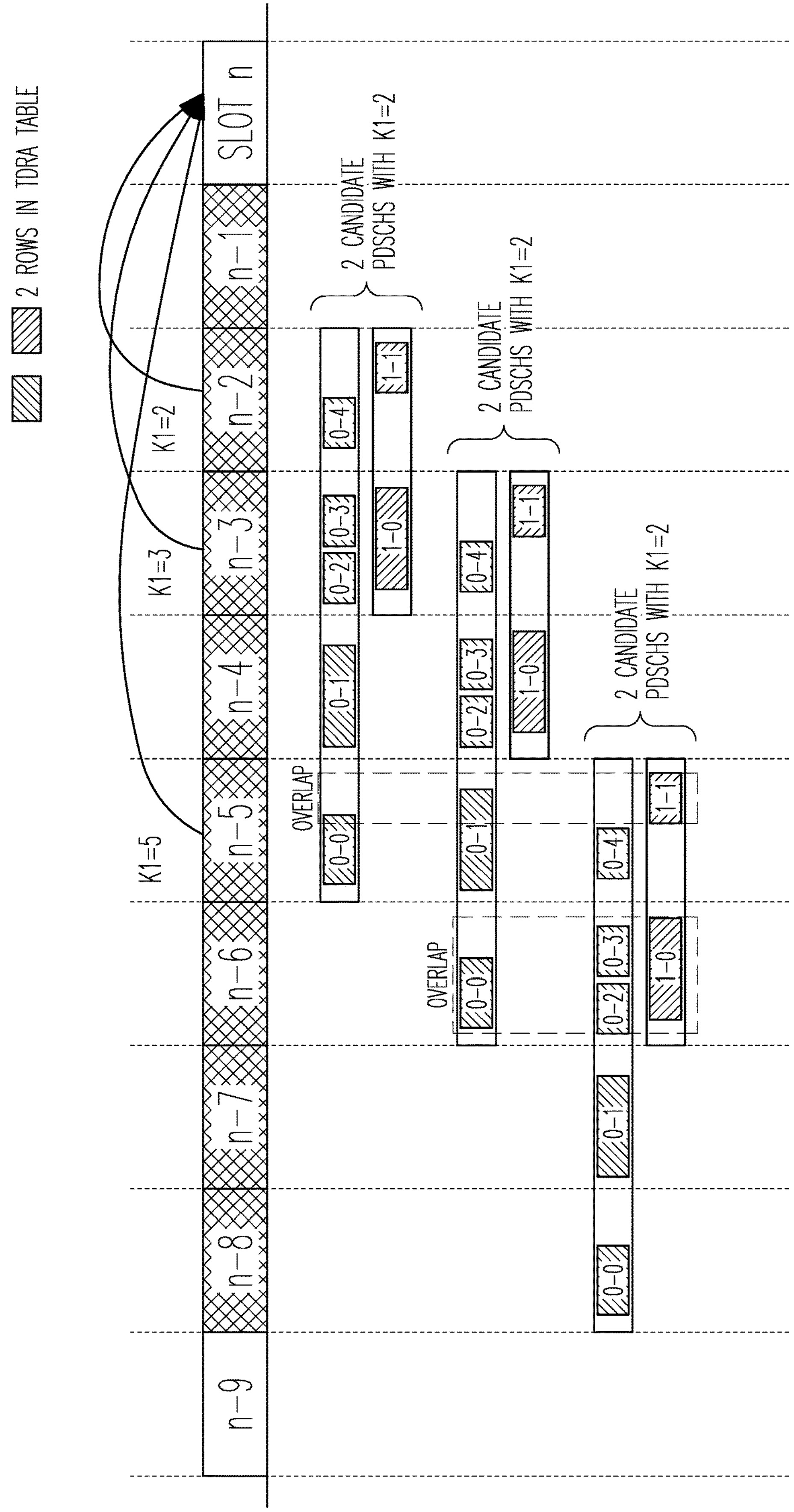
FIG. 6 illustrates occasions generated by checking a respective set of rows, in accordance with some embodiments.

The same assumption as FIG. 4 on set of K1 and TDRA table are used in FIG. 6. For example, there are 4 pairs $(d_{k,j},r)$ for determined DL slot n-5, e.g.

Row 0 corresponding to K1=2, e.g. pair $(d_{2,0}, 0)$
Row 0 corresponding to K1=3, e.g. pair $(d_{1,0}, 0)$
Row 0 corresponding to K1=5, e.g. pair $(d_{0,0}, 0)$
Row 1 corresponding to K1=5, e.g. pair $(d_{0,0}, 1)$ If only the SLIVs which maps to DL slot n-5 is considered as shown in FIG. 5, there are two non-overlap SLIVs, e.g. SLIV 1-4 and SLIV 2-1, hence two occasions are necessary for slot n-5. However, by checking the overlap of the 4 pairs $(d_{k,j},r)$, only one occasion is needed for slot n-5, since any two of the four pairs are overlapped. In FIG. 6, the number of occasions for each determined DL slots are {1, 1, 2, 1, 2, 2, 2} respectively.

The determined DL slots by the set of K1 are ordered in ascending order, e.g. $D_k$, k=0, 1, . . . . For example, referring to the pseudo code in section 9.1.2.1 in TS 38.213, G is a group of pairs $(d_{k,j},r)$ for a determined DL slot, where, for any two pairs in a group, at least one SLIV of a first pair is overlapped with the SLIV(s) of a second pair. For example, a pair with smallest last OFDM symbol index in the determined DL slot among all remaining pairs is determined and is used to generate a group of G.

$O_j$ is to determine the number of occasions that need to be allocated for the determined DL slot for the group of G

```
Set j = 0 - index of occasion for candidate PDSCH reception or SPS
PDSCH release
Set B = ∅
Set M_{A,c} = ∅
Set C(D) to the cardinality of set D
Set k = 0 - index of determined DL slot in ascending order in set D
while k < C(D)
Set R to the set of pairs for determined DL slot k
Set C(R) to the cardinality of R
Set m to the index of a pair with smallest last OFDM symbol index in the
determined DL slot k among all pairs of R
while R ≠ ∅
Set r = 0
Set O_j = 1
Set G = m - a group of pairs including pair m, any two pairs in the group
are overlapped
while r < C(R)
if pair r is overlapped with all pairs of G
b_{r,k} = j; - lowest index of occasion for candidate PDSCH reception or
SPS PDSCH release associated with SLIV(s) of pair r in the
determined DL slot k
O_j = max(A,O_j), A is the number of SLIV(s) that are available for
PDSCH transmission of pair r in the determined DL slot k
R = R\r;
G = G ∪ r; - add an element of pair r to the group of G
B = B ∪ b_{r,k};
else
r = r + 1;
end if
end while
M_{A,c} = M_{A,c} ∪ (j, j + 1, . . . , j + O_j − 1);
j = j + O_j;
Set m to the index of a pair with smallest last OFDM symbol index in the
determined DL slot k among all pairs of R;
end while
k = k + 1;
end while
```

In another option, for a determined DL slot, the set of pairs $(d_{k,j},r)$ are divided into one or multiple groups. If a pair contains N SLIVs that are available for PDSCH transmissions in the determined DL slot, the pair is treated as N pairs which respectively contain the N SLIVs in the determined DL slot, N≥1. The SLIVs in slots other than the determined DL slot for the pair commonly apply to the N pairs. Consequently, the pair belongs to N groups. For any two pairs in a group, at least one SLIV of a first pair is overlapped with the SLIV(s) of a second pair. For the determined DL slot, one occasion is allocated for each group of pairs respectively. For the pair containing N SLIVs in the determined DL slot, the N occasions determined for the N groups are respectively used to carry HARQ-ACK of the N SLIVs.

Figure 7:
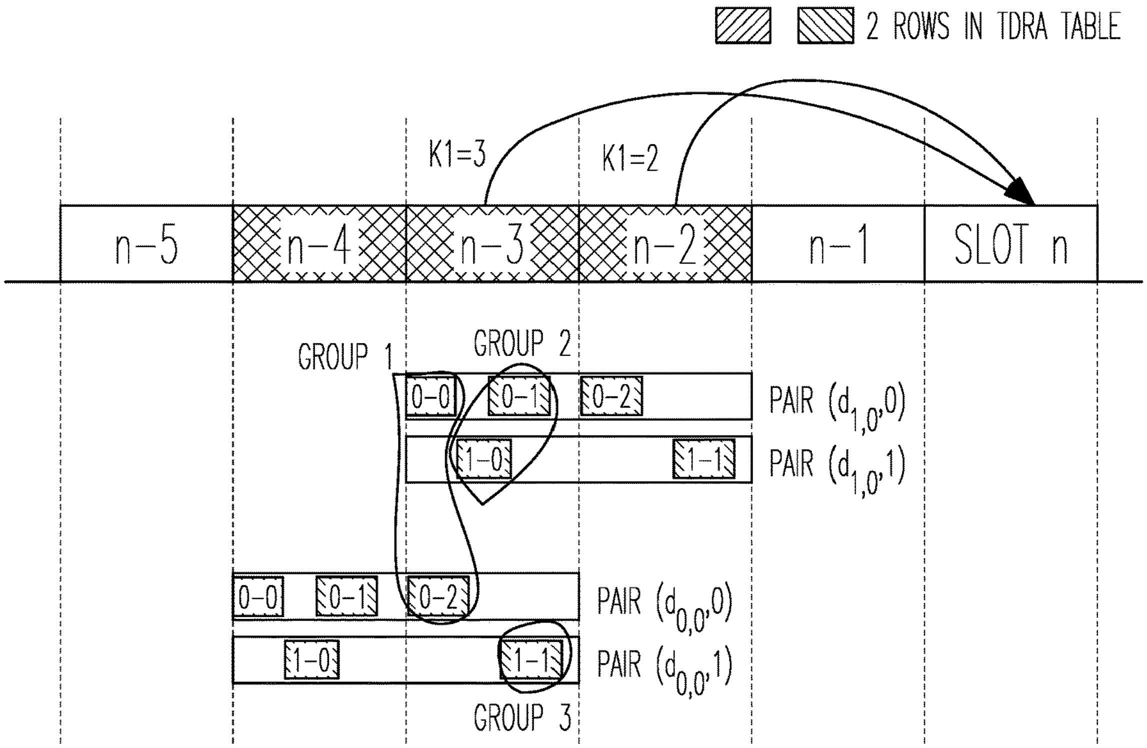
FIG. 7 illustrates occasions generated by treating a pair ($d_{1,0}$, 0) as two pairs contains the SLIV 0-0 and 0-1 in slot n-3 respectively, in accordance with some embodiments.

FIG. 7 illustrates one example of the configuration of set of K1 and set of rows in TDRA table. It assumes that the SCS for PUCCH transmission and the PDSCH transmission is the same. In this example, the set of K1 have 2 values 2 and 3. It is assumed the maximum number of PDSCHs scheduled by a DCI is 3. The TDRA table include 2 rows. The first row has 3 SLIVs which are allocated in 2 consecutive slots, e.g. SLIV {0-0, 0-1, 0-2}. the second row has 2 SLIVs in two consecutive slots, e.g. SLIV {1-0, 1-1}. Corresponding to HARQ-ACK transmission in slot n, the ending DL slots that are determined by the set of K1 are slot n-3 and n-2. All the possible PDSCH transmissions are in slot n-4 to slot n-2.

For example, there are 4 pairs ($d_{k,j}$,r) for determined DL slot n-3 in FIG. 7, e.g.

Row 0 corresponding to K1=2, e.g. pair ($d_{1,0}$, 0)

Row 1 corresponding to K1=2, e.g. pair ($d_{1,0}$, 1)

Row 1 corresponding to K1=3, e.g. pair ($d_{0,0}$, 0)

Row 1 corresponding to K1=3, e.g. pair ($d_{0,0}$, 1)

Since the pair ($d_{1,0}$, 0) has two SLIVs in slot n-3, pair ($d_{1,0}$, 0) is treated as two pairs, e.g. ($d_{1,0}$, 0) with SLIV 0-0 in slot n-3 and ($d_{1,0}$, 0) with SLIV 0-1 in slot n-3. Therefore, there are effectively 5 pairs which are divided into 3 groups. The first group includes pair ($d_{1,0}$, 0) with SLIV 0-0 in slot n-3 and ($d_{0,0}$, 0). The second group includes pair ($d_{1,0}$, 0) with SLIV 0-1 in slot n-3 and ($d_{1,0}$, 0). The third group includes pair ($d_{0,0}$, 0). Three occasions are allocated to the three groups respectively. the SLIV 0-0 of pair ($d_{1,0}$, 0) is associated with the occasion for the first group, while the SLIV 0-1 of pair ($d_{1,0}$, 0) is associated with the occasion for the second group. In FIG. 7, the number of occasions for each determined DL slots are {1, 3, 1} respectively.

The determined DL slots by the set of K1 are ordered in ascending order, e.g. $D_k$, k=0, 1, . . . . For example, referring to the pseudo code in section 9.1.2.1 in TS 38.213, G is a group of pairs ($d_{k,j}$,r) for a determined DL slot, where, for any two pairs in a group, at least one SLIV of a first pair is overlapped with the SLIV(s) of a second pair. For example, a pair with smallest last OFDM symbol index in the determined DL slot among all remaining pairs is determined and is used to generate a group of G.

```
Set j = 0 - index of occasion for candidate PDSCH reception or SPS
PDSCH release
Set B = ∅
Set M_{A,c} = ∅
Set C(D) to the cardinality of set D
Set k = 0 - index of determined DL slot in ascending order in set D
while k < C(D)
for a pair contains N SLIVs that are available for PDSCH transmissions in
the determined DL slot, the pair is treated as N pairs which respectively
contain the N SLIVs in the determined DL slot, N ≥ 1. The SLIVs in slots
other than the determined DL slot for the pair commonly apply to the N
pairs.
Set R to the set of pairs for determined DL slot k
Set C(R) to the cardinality of R
Set m to the index of a pair with smallest last OFDM symbol index in the
determined DL slot k among all pairs of R
while R ≠ ∅
Set r = 0
Set G = m - a group of pairs including pair m, any two pairs in the group
are overlapped
while r < C(R)
```

-continued

```
f pair r is overlapped with all pairs of G
b_{r,k} = j; - index of occasion for candidate PDSCH reception or SPS
PDSCH release associated with the SLIV of pair r in the determined DL
slot k
R = R\r;
G = G ∪ r; - add an element of pair r to the group of G
B = B ∪ b_{r,k};
else
r = r + 1;
end if
end while
M_{A,c} = M_{A,c} ∪ j;
Set m to the index of a pair with smallest last OFDM symbol index in the
determined DL slot k among all pairs of R;
end while
k = k + 1;
end while
```

In another option, for a determined DL slot, the set of pairs ($d_{k,j}$,r) are divided into one or multiple groups. If a pair contains N SLIVs that are available for PDSCH transmissions in the determined DL slot, the pair is grouped into N groups which are respectively used to allocate the occasions for the N SLIVs, N≥1. The largest OFDM symbol index of the N SLIVs in the determined DL slot could be always referred in the allocation of occasion(s). For any two pairs in a group, at least one SLIV of a first pair is overlapped with the SLIV(s) of a second pair. To check the overlap between the pair with N SLIVs and another pair, all the N SLIVs can be considered. For the determined DL slot, one occasion is allocated for each group of pairs respectively. For the pair containing N SLIVs in the determined DL slot, the N occasions determined for the N groups are respectively used to carry HARQ-ACK of the N SLIVs.

Figure 8:
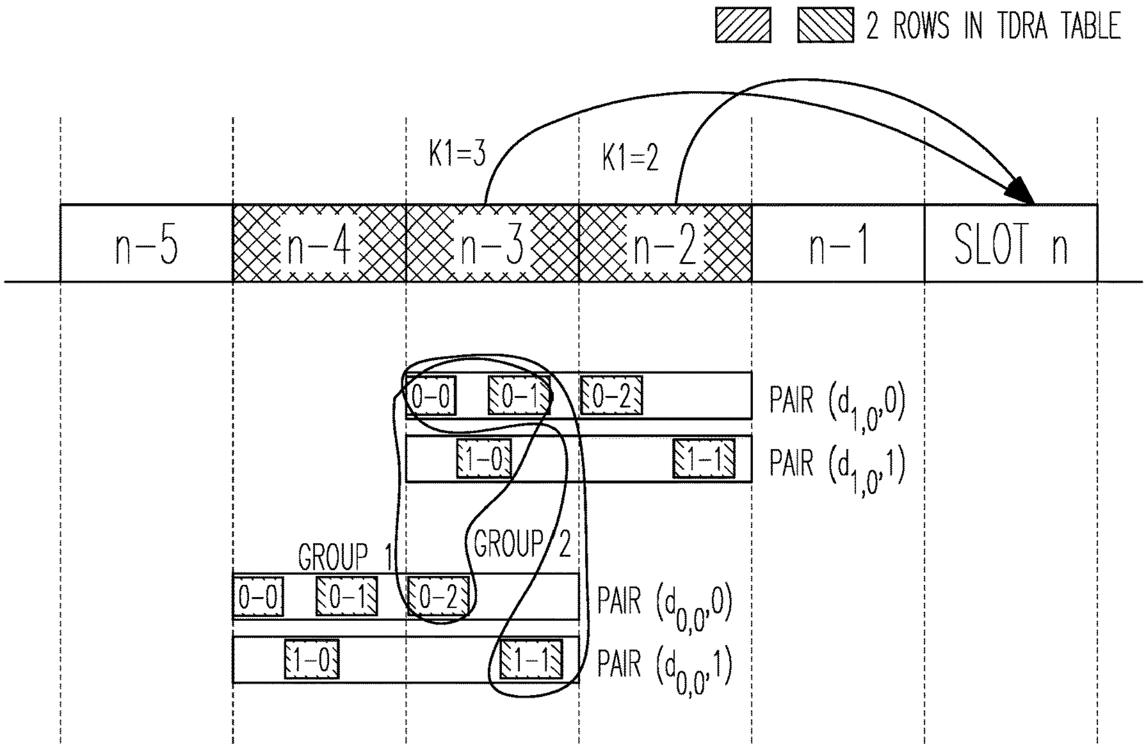
FIG. 8 illustrates occasions generated by treating a pair ($d_{1,0}$, 0) repeatedly for SLIV 0-0 and 0-1 in slot n-3, in accordance with some embodiments.

The same assumption as FIG. 7 on set of K1 and TDRA table are used in FIG. 8. The 4 pairs are divided into 2 groups, e.g. group 1 and group 2. Group 1 includes pair ($d_{1,0}$, 0), ($d_{1,0}$, 1), ($d_{0,0}$, 0). Group 2 includes pair ($d_{1,0}$, 0) and ($d_{0,0}$, 0). Since the pair ($d_{1,0}$, 0) has two SLIVs in slot n-3, pair ($d_{1,0}$, 0) belongs to the 2 groups. Group 1 is used to allocate occasion for the SLIV 0-0 in slot n-3 of pair ($d_{1,0}$, 0). Group 2 is used to allocate occasion for the SLIV 0-1 in slot n-3 of pair ($d_{1,0}$, 0). Two occasions are allocated to the Two groups respectively. the SLIV 0-0 of pair ($d_{1,0}$, 0) is associated with the occasion for the first group, while the SLIV 0-1 of pair ($d_{1,0}$, 0) is associated with the occasion for the second group. In FIG. 8, the number of occasions for each determined DL slots are {1, 2, 1} respectively.

The determined DL slots by the set of K1 are ordered in ascending order, e.g. $D_k$, k=0, 1, . . . . For example, referring to the pseudo code in section 9.1.2.1 in TS 38.213, G is a group of pairs ($d_{k,j}$,r) for a determined DL slot, where, for any two pairs in a group, at least one SLIV of a first pair is overlapped with the SLIV(s) of a second pair. For example, a pair with smallest last OFDM symbol index in the determined DL slot among all remaining pairs is determined and is used to generate a group of G.

```
Set j = 0 - index of occasion for candidate PDSCH reception or SPS
PDSCH release
Set B = ∅
Set M_{A,c} = ∅
Set C(D) to the cardinality of set D
Set k = 0 - index of determined DL slot in ascending order in set D
while k < C(D)
for a pair contains N SLIVs that are available for PDSCH transmissions in
```

-continued

```
the determined DL slot, the pair is treated as N pairs which
respectively contain the N SLIVs in the determined DL slot,
N ≥ 1. The SLIVs in slots other than the determined DL slot
for the pair commonly apply to the N pairs.
Set R to the set of pairs for determined DL slot k
Set C(R) to the cardinality of R
Set m to the index of a pair with smallest last OFDM symbol index in the
determined DL slot k among all pairs of R
while R ≠ ∅
Set r = 0
Set G = m - a group of pairs including pair m, any two pairs in the
group are overlapped
while r < C (R)
if pair r is overlapped with all pairs of G
b_{r,k} = j; - index of occasion for candidate PDSCH reception or SPS
PDSCH release associated with the SLIV of pair r in the determined
DL slot k
R = R\r;
G = G ∪ r; - add an element of pair r to the group of G
B = B ∪ b_{r,k};
else
r = r + 1;
end if
end while
M_{A,c} = M_{A,c} ∪ j;
Set m to the index of a pair with smallest last OFDM symbol index in the
determined DL slot k among all pairs of R;
end while
k = k + 1;
end while
```

In another option, for a determined DL slot, the set of pairs ($d_{k,j}$,r) are divided into one or multiple groups. If a pair contains N SLIVs that are available for PDSCH transmissions in the determined DL slot, the pair is grouped into N groups which are respectively used to allocate the occasions for the N SLIVs, ((N≥1)). The largest OFDM symbol index of the N SLIVs in the determined DL slot could be always referred in the allocation of occasion(s). For any two pairs in a group, at least one SLIV of a first pair is overlapped with the SLIV(s) of a second pair. To check the overlap between the pair with N SLIVs and another pair, all the N SLIVs can be considered. For the determined DL slot, one occasion is allocated for each group of pairs respectively. For the pair containing N SLIVs in the determined DL slot, the N occasions determined for the N groups are respectively used to carry HARQ-ACK of the N SLIVs.

The same assumption as FIG. 7 on set of K1 and TDRA table are used in FIG. 8. The 4 pairs are divided into 2 groups, e.g. group 1 and group 2. Group 1 includes pair ($d_{1,0}$, 0), ($d_{1,0}$, 1), ($d_{0,0}$, 0). Group 2 includes pair ($d_{1,0}$, 0) and ($d_{0,0}$, 1). Since the pair ($d_{1,0}$, 0) has two SLIVs in slot n-3, pair ($d_{1,0}$, 0) belongs to the 2 groups. Group 1 is used to allocate occasion for the SLIV 0-0 in slot n-3 of pair ($d_{1,0}$, 0). Group 2 is used to allocate occasion for the SLIV 0-1 in slot n-3 of pair ($d_{1,0}$, 0). Two occasions are allocated to the Two groups respectively. the SLIV 0-0 of pair ($d_{1,0}$, 0) is associated with the occasion for the first group, while the SLIV 0-1 of pair ($d_{1,0}$, 0) is associated with the occasion for the second group. In FIG. 8, the number of occasions for each determined DL slots are {1, 2, 1} respectively.

The determined DL slots by the set of K1 are ordered in ascending order, e.g $D_k$, k=0, 1, . . . . For example, referring to the pseudo code in section 9.1.2.1 in TS 38.213, G is a group of pairs ($d_{k,j}$,r) for a determined DL slot, where, for any two pairs in a group, at least one SLIV of a first pair is overlapped with the SLIV(s) of a second pair. For example, a pair with smallest last OFDM symbol index in the determined DL slot among all remaining pairs is determined and is used to generate a group of G.

```
Set j = 0 - index of occasion for candidate PDSCH reception or
SPS PDSCH release
Set B = ∅
Set M_{A,c} = ∅
Set C(D) to the cardinality of set D
Set k = 0 - index of determined DL slot in ascending order in set D
while k < C(D)
Set R to the set of pairs for determined DL slot k
Set C(R) to the cardinality of R
Set m to the index of a pair with smallest last OFDM symbol
index in the determined DL slot k among all pairs of R
while R ≠ ∅
Set r = 0
Set G = m - a group of pairs including pair m, any two pairs in
the group are overlapped
while r < C(R)
if pair r is overlapped with all pairs of G
b_{r,k} = j; - index of occasion for candidate PDSCH reception or
SPS PDSCH release associated with a SLIV without allocated occasion
of pair r in the determined DL slot k
  if all SLIV(s) of pair r have allocated occasions
  R = R\r;
  end if
G = G ∪ r; - add an element of pair r to the group of G
B = B ∪ b_{r,k};
else
r = r + 1;
end if
end while
M_{A,c} = M_{A,c} ∪ j;
Set m to the index of a pair with smallest last OFDM symbol
index in the determined DL slot k among all pairs of R;
end while
k = k + 1;
end while
```

Occasions Separately Determined for Each Ending Slot for PDSCH Transmissions

Corresponding to a value $K_{1,k}$ in the set of K1, one or more ending DL slots for the PDSCH transmissions can be determined. For the HARQ-ACK transmission in UL slot $n_U$ and value $K_{1,k}$, PDSCH transmission(s) can be ended in DL slots $\lfloor (n_U - K_{1,k}) \cdot 2^{\mu_{DL}-\mu_{DL}} \rfloor + j$, j=0, 1, . . . , $\lceil 2^{\mu_{DL}-\mu_{DL}} \rceil - 1$. Then, the occasions for candidate PDSCH receptions can be allocated for each determined ending DL slot respectively.

For each ending DL slot determined by a value $K_{1,k}$ in the set of K1, a row in TDRA table is considered as valid, if at least X SLIV(s) corresponding to the row are available for PDSCH transmission by applying the semi-static TDD UL-DL configuration, if the PDSCH transmission corresponding to the row is scheduled by a DCI indicating the value $K_{1,k}$ and ends in the determined ending slot. X could be a fixed value, e.g. 1, or X can be configured by high layer signaling.

In one embodiment, the occasion(s) for candidate PDSCH receptions are separately allocated for each ending slot determined by a value $K_{1,k}$ in the set of K1, if at least one row in the TDRA table is valid for potential PDSCH transmission by applying the semi-static TDD UL-DL configuration. To allocate occasion(s) that are associated with a determined ending DL slot, the last SLIV of all valid rows of the determined ending DL slot are processed. For example, the procedure for Type1 HARQ-ACK codebook generation in NR can be reused to generate occasions for an ending slot determined by the value $K_{1,k}$.

Figure 9:
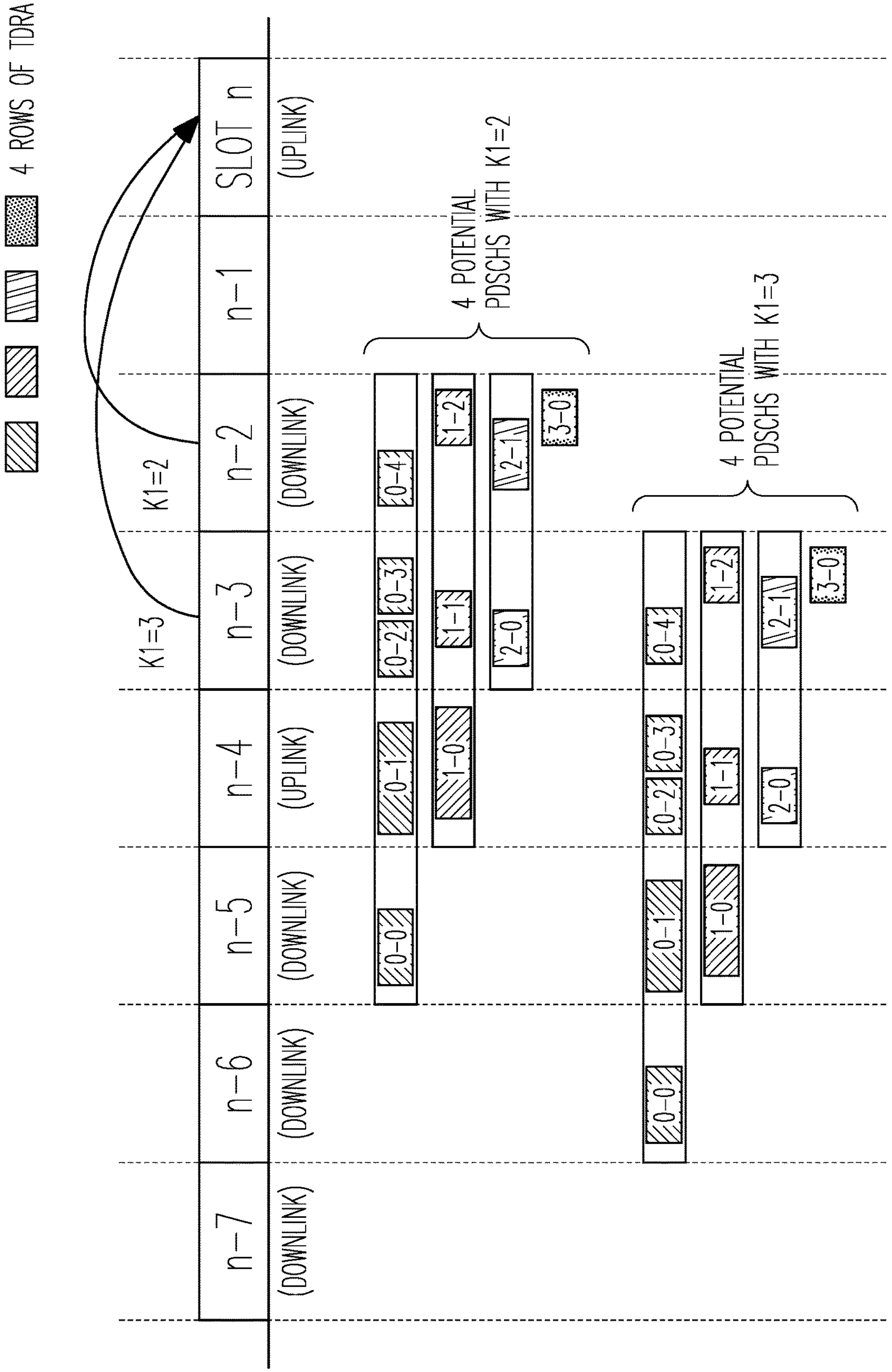
FIG. 9 illustrates occasions generated by checking a last SLIV of an ending downlink (DL) slot, in accordance with some embodiments.

FIG. 9 illustrates one example of the configuration of set of K1 and set of rows in TDRA table. It assumes that the SCS for PUCCH transmission and the PDSCH transmission is the same. In this example, the set of K1 have 2 values 2 and 3. It is assumed the maximum number of PDSCHs scheduled by a DCI is 5. The TDRA table include 4 rows. The first row has 5 SLIVs which are allocated in 4 consecutive slots, e.g. SLIV {0-0, 0-1, 0-2, 0-3, 0-4}. The second row has 3 SLIVs in three consecutive slots, e.g. SLIV {1-0, 1-1, 1-2}. The third row has 2 SLIVs in two consecutive slots, e.g. SLIV {2-0, 2-1}. the fourth row has single SLIV, e.g. SLIV {3-0}. Corresponding to HARQ-ACK transmission in slot n, the ending DL slots that are determined by the set of K1 is slot n-3 and n-2.

In one option, the number of HARQ-ACK bits for an occasion associated with an ending slot determined by the value $K_{1,k}$ is the maximum number of configured SLIVs among all rows times N. Alternatively, the number of HARQ-ACK bits for an occasion associated with an ending slot determined by value $K_{1,k}$ is the maximum number of configured SLIVs among all valid rows times N. N is the number of TBs per PDSCH if a code block group (CBG) based transmission is not used. Otherwise, N is the number of CBG per PDSCH.

In FIG. 9, 2 occasions of candidate PDSCH receptions are allocated for DL slot n-2. 5 HARQ-ACK bits are reported for each occasion since the maximum number of configured SLIVs among all rows is 5.

In one option, the number of HARQ-ACK bits for an occasion associated with an ending slot determined by value $K_{1,k}$ is determined by the maximum number of SLIVs that are available for PDSCH transmission among all valid rows by applying the semi-static TDD UL-DL configuration. For a valid row r, denote the number of SLIV(s) that are available for PDSCH transmission by applying the semi-static TDD UL-DL configuration as $$M_{row}^{r}.$$

The number of HARQ-ACK bits for an occasion associated with the ending slot determined by value $K_{1,k}$ is the maximum value $$M_{row}^{r}$$

among all valid rows times N.

In FIG. 9, 2 occasions of candidate PDSCH receptions are allocated for DL slot n-2. 4 HARQ-ACK bits are reported for each occasion since maximum number of available SLIVs among all rows is 4 by excluding uplink slot n-4 which cannot be used for PDSCH transmission.

In one option, the number of HARQ-ACK bits is separately determined for each occasion associated with an ending slot determined by value $K_{1,k}$. The number of HARQ-ACK bits for an occasion is the maximum number of configured SLIVs among all valid rows that are associated with the occasion times N.

In FIG. 9, 2 occasions of candidate PDSCH receptions are allocated for DL slot n-2. The first and third rows are associated with the first occasion. The second and fourth rows are associated with the second occasion. 5 HARQ-ACK bits are reported for the first occasion since maximum number of configured SLIVs of the first and third rows is 5. On the other hand, 3 HARQ-ACK bits are reported for the second occasion since maximum number of configured SLIVs of the second and fourth rows is 3.

In one option, the number of HARQ-ACK bits is separately determined for each occasion associated with an ending slot determined by a value $K_{1,k}$ by applying the semi-static TDD UL-DL configuration. For a valid row r that is associated with an occasion for a determined ending slot, the number of SLIV(s) that are available for PDSCH transmission by applying the semi-static TDD UL-DL configuration is denoted as $$M_{row}^{r}.$$

The number of HARQ-ACK bits for the occasion is the maximum value $$M_{row}^{k}$$

among all valid rows that are associated with the occasion times N.

In FIG. 9, 2 occasions of candidate PDSCH receptions are allocated for DL slot n-2. The first and third rows are associated with the first occasion. The second and fourth rows are associated with the second occasion. 4 HARQ-ACK bits are reported for the first occasion since maximum number of available SLIVs of the first and third rows is 4 by excluding uplink slot n-4 which cannot be used for PDSCH transmission. On the other hand, 2 HARQ-ACK bits are reported for the second occasion since maximum number of available SLIVs of the second and fourth rows is 2 by excluding uplink slot n-4 which cannot be used for PDSCH transmission.

In one embodiment, for each ending DL slot determined by a value $K_{1,k}$ in the set of K1, the valid rows in TDRA table are divided into one or multiple groups. For any two valid rows in a group, at least one SLIV of a first row is overlapped with the SLIV(s) of a second row. For example, the valid rows can be grouped based on the last SLIV of the valid rows and by checking the overlap of the valid rows. One occasion of candidate PDSCH reception is allocated for each group of valid rows.

Figure 10:
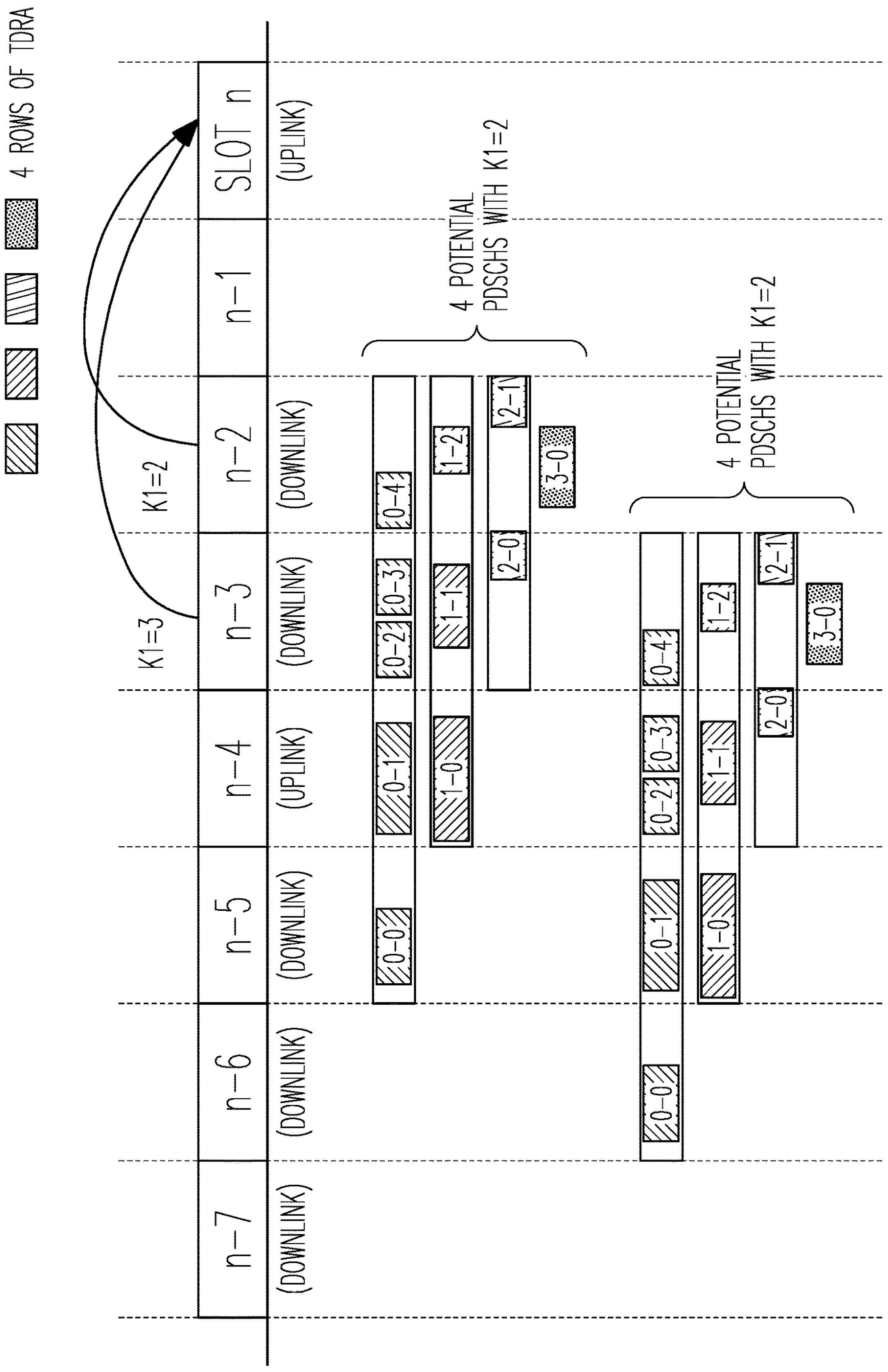
FIG. 10 illustrates occasions generated by checking an entire row of an ending DL slot, in accordance with some embodiments.

FIG. 10 illustrates one example of the configuration of set of K1 and set of rows in TDRA table. It assumes that the SCS for PUCCH transmission and the PDSCH transmission is the same. In this example, the set of K1 have 2 values 2 and 3. It is assumed the maximum number of PDSCHs scheduled by a DCI is 5. The TDRA table include 4 rows. The first row has 5 SLIVs which are allocated in 4 consecutive slots, e.g. SLIV {0-0, 0-1, 0-2, 0-3, 0-4}. The second row has 3 SLIVs in three consecutive slots, e.g. SLIV {1-0, 1-1, 1-3}. The third row has 2 SLIVs in two consecutive slots, e.g. SLIV {2-0, 2-1}. the fourth row has single SLIV, e.g. SLIV {3-0}. Corresponding to HARQ-ACK transmission in slot n, the ending DL slots that are determined by the set of K1 is slot n-3 and n-2.

In FIG. 10, the same grouping applies to the two determined ending DL slots. The rows can be divided into two groups. The first group consists of row 0, row 1 and row 3. The second group consists of row 2. Therefore, two occasions of candidate PDSCH receptions are allocated for each determined ending DL slot.

In one option, the number of HARQ-ACK bits for an occasion associated with an ending slot determined by a value $K_{1,k}$ is the maximum number of configured SLIVs among all rows times N. Alternatively, the number of HARQ-ACK bits for an occasion associated with an ending slot determined by a value $K_{1,k}$ is the maximum number of configured SLIVs among all valid rows times N. N is the number of TBs per PDSCH if CBG based transmission is not used. Otherwise, N is the number of CBG per PDSCH.

For example, in FIG. 10, for DL slot n-2, 5 HARQ-ACK bits can be reported for each occasion since the maximum number of configured SLIVs among all rows is 5.

In one option, the number of HARQ-ACK bits for an occasion associated with an ending slot determined by a value $K_{1,k}$ is determined by the maximum number of SLIVs that are available for PDSCH transmission among all valid rows by applying the semi-static TDD UL-DL configuration. For a valid row r, denote the number of SLIV(s) that are available for PDSCH transmission by applying the semi-static TDD UL-DL configuration as $$M^r_{row}.$$

The number of HARQ-ACK bits for an occasion associated with the ending slot determined with value $K_{1,k}$ is the maximum value $$M^r_{row}$$

among all valid rows times N.

For example, in FIG. 10, for DL slot n-2, 4 HARQ-ACK bits are reported for each occasion since maximum number of available SLIVs among all valid rows is 4 by excluding uplink slot n-4 which cannot be used for PDSCH transmission.

In one option, the number of HARQ-ACK bits is separately determined for each occasion associated with an ending slot determined by a value $K_{1,k}$. The number of HARQ-ACK bits for an occasion is the maximum number of SLIVs that are available for PDSCH transmission among all valid rows that are associated with the occasion times N.

For example, in FIG. 10, for DL slot n-2, 5 HARQ-ACK bits are reported for the first occasion since maximum number of configured SLIVs of the rows in the first group is 5. On the other hand, 3 HARQ-ACK bits are reported for the second occasion since maximum number of configured SLIVs of the row in the second group is 3.

In one option, the number of HARQ-ACK bits is separately determined for each occasion associated with an ending slot determined by a value $K_{1,k}$ by applying the semi-static TDD UL-DL configuration. For a valid row r that is associated with an occasion for a determined ending DL slot, the number of SLIV(s) that are available for PDSCH transmission by applying the semi-static TDD UL-DL configuration is denoted a $$M^r_{row}.$$

The number of HARQ-ACK bits for the occasion is the maximum value $$M^r_{row}$$

among all valid rows that are associated with the occasion times N.

For example, in FIG. 10, for DL slot n-2, 4 HARQ-ACK bits are reported for the first occasion since maximum number of available SLIVs of the rows in the first group is 4 by excluding uplink slot n-4 which cannot be used for PDSCH transmission. On the other hand, 2 HARQ-ACK bits are reported for the second occasion since maximum number of available SLIVs of the rows in the second group is 2 by excluding uplink slot n-4 which cannot be used for PDSCH transmission.

The determined ending DL slots by the set of K1 are ordered in ascending order, e.g. Ek, k=0, 1, . . . . F For example, referring to the pseudo code in section 9.1.2.1 in TS 38.213, $O_j$ is to determine the maximum number of SLIVs that is available for PDSCH transmission for an occasion j for candidate PDSCH reception.

G is a group of valid rows for a determined ending DL slot, where, for any two valid rows in a group, at least one SLIV of a first row is overlapped with the SLIV(s) of a second row.

```
Set j = 0 - index of occasion for candidate PDSCH reception or SPS
PDSCH release
Set B = ∅
Set M_{A,c} = ∅
Set C(E) to the cardinality of set E
Set k = 0 - index of determined ending DL slot in ascending order in set
E
While k < C(E)
Set R to the set of valid rows for determined ending DL slot k
Set C(R) to the cardinality of R
Set m to the index of a row with smallest last OFDM symbol index in the
determined ending DL slot k among all rows of R
while R ≠ ∅
Set r = 0
Set O_j = 1
Set G = m - the group of rows including row m, any two rows in the
group are overlapped
while r < C (R)
if row r is overlapped with all rows of G
b_{r,k} = j; - index of occasion for candidate PDSCH reception or SPS
PDSCH release associated with row r
O_j = max(A,O_j), A is the number of SLIV(s) that are available for
PDSCH transmission of row r;
R = R\r;
G = G ∪ r; - add an element of row r to the group of G
B = B ∪ b_{r,k};
else
r = r + 1;
end if
end while
M_{A,c} = M_{A,c} ∪ j;
j = j + 1;
Set m to the index of a row with smallest last OFDM symbol index in the
determined ending DL slot k among all rows or R;
end while
k = k + 1;
end while
```

Occasions Jointly Determined for all Ending Slots for PDSCH Transmissions

Corresponding to a value $K_{1,k}$ in the set of K1, one or more ending DL slots for the PDSCH transmissions can be determined. For the HARQ-ACK transmission in UL slot $n_U$ and value $K_{1,k}$, PDSCH transmission(s) can be ended in DL slots $\lfloor n_U - K_{1,k}) \cdot 2^{\mu_{DL}-\mu_{DL}} \rfloor + j$, j=0, 1, . . . , $\lceil 2^{\mu_{DL}-\mu_{DL}} \rceil - 1$. For each ending DL slot determined by a value $K_{1,k}$ in the set of K1, a row in TDRA table is considered as valid, if at least X SLIV(s) corresponding to the row are available for PDSCH transmission by applying the semi-static TDD UL-DL configuration, if the PDSCH transmission corresponding to the row is scheduled by a DCI indicating the value $K_{1,k}$ and ends in the determined ending slot. X could be a fixed value, e.g. 1, or X can be configured by high layer signaling.

In one embodiment, all pairs ($d_{k,j}$,r) including all valid rows corresponding to all the ending DL slots determined by all values in the set of K1 can be divided into the one or multiple groups, then occasions of candidate PDSCH receptions in Type1 HARQ-ACK codebook can be generated for the one or multiple groups. The occasions are allocated for each group separately and concatenated. A pair ($d_{k,j}$,r) indicates the PDSCH transmissions that can be scheduled by a DCI indicating a valid row r in TDRA table and value $K_{1,k}$ and end in DL slot $\lfloor n_U - K_{1,k}) \cdot 2^{\mu_{DL}-\mu_{DL}} \rfloor + j$. For any two pairs in a group, at least one SLIV of a first pair is overlapped with the SLIV(s) of a second pair, or if any SLIV of a first pair is not overlapped with any SLIV of a second pair, the two pairs are not mapped in the same slot.

The occasions for a group of pairs are allocated with the following rules:

For a pair ($d_{k,j}$,r), denote the number of SLIV(s) that are available for PDSCH transmission by applying the semi-static TDD UL-DL configuration as $$M_{row}^r,\ M_{row}^r$$

consecutive occasions are allocated for the row.

If two pairs in the group are not overlapped, separate occasions are allocated for the two pairs If two pairs in the group are overlapped, the same occasions can be allocated to the two pairs if the rule 2) is not violated.

The slot timing values in the set of K1 are ordered in descending order, e.g. $K_{1,k}$, k=K−1, K−2, . . . , 0. K is the number of configured slot timing values. For example, for a group of pairs, For each k in descending order—k=K−1, K−2, . . . , 0

For each j in ascending order—j=0, 1, . . . , $\lceil 2^{\mu_{DL}-\mu_{UL}} \rceil - 1$ For each row r Set E=−1

Set E to the maximum number of $$E_{k',j'}^{r'}$$

among all pairs ($d_{k',j'}$,r') which end in a DL slot that is earlier than the starting slot for pair ($d_{k,j}$,r)

Set $$S_{k,j}^r = E + 1$$

—the starting occasion index for the pair ($d_{k,j}$,r)

Set $$E_{k,j}^r = E + L_{avail} - 1,$$

$L_{avail}$ is number of SLIVs that are available for PDSCH transmission for the pair ($d_{k,j}$,r)—the ending occasion index for the pair ($d_{k,j}$,r)

The number of occasions equals to the maximum number of $$E_{k,j}^r$$

among all pairs ($d_{k,j}$,r)

Figure 11:
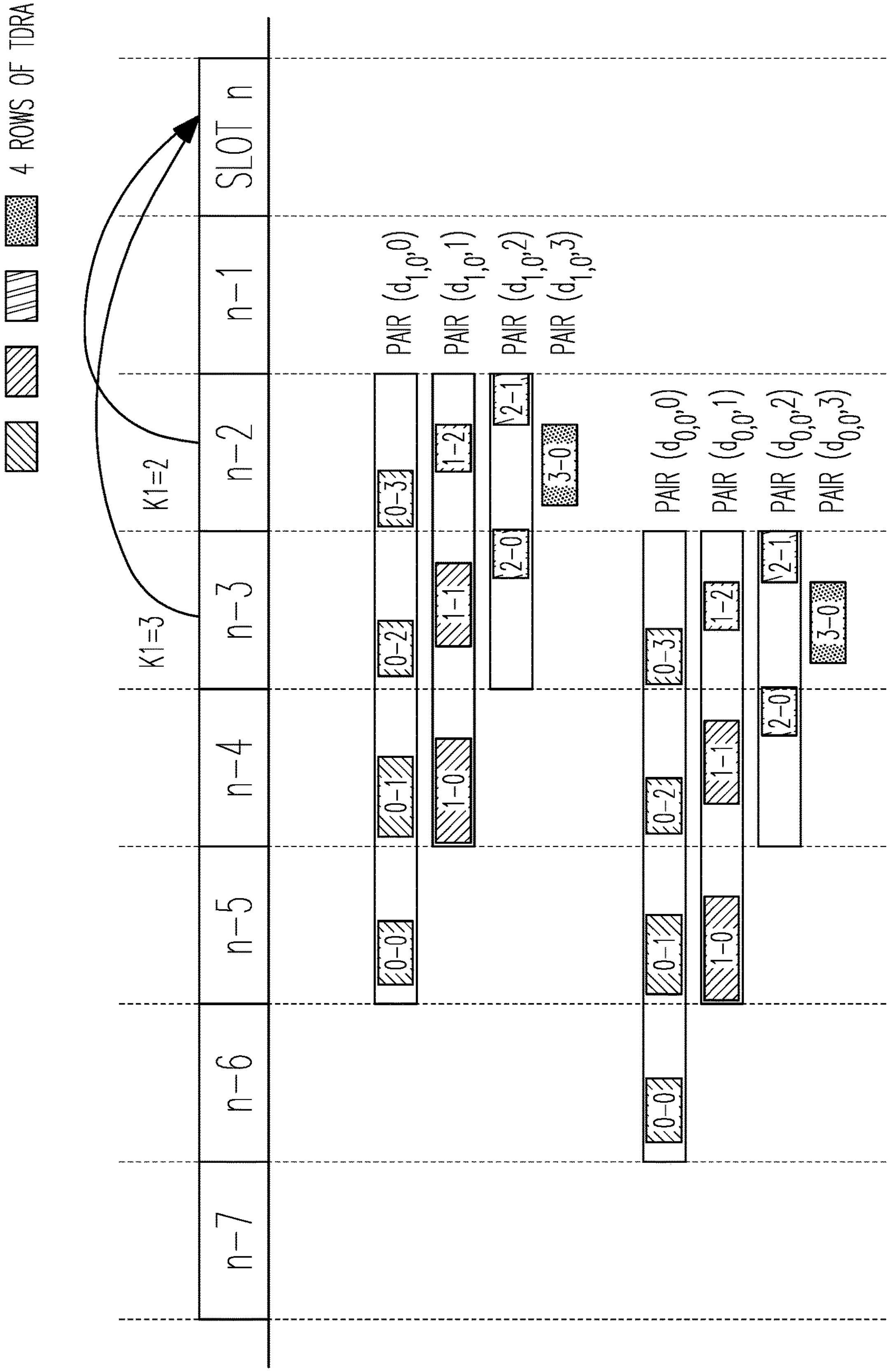
FIG. 11 illustrates occasions generated by checking all pairs ($d_{k,j}$,r), in accordance with some embodiments.

FIG. 11 illustrates one example of the configuration of set of K1 and set of rows in TDRA table. In this example, the set of K1 have 2 values 2 and 3. It is assumed the maximum number of PDSCHs scheduled by a DCI is 4. The TDRA table include 4 rows. The first row has 4 SLIVs which are allocated in 4 consecutive slots, e.g. SLIV {0-0, 0-1, 0-2, 0-3}. The second row has 3 SLIVs in three consecutive slots, e.g. SLIV {1-0, 1-1, 1-2}. The third row has 2 SLIVs in two consecutive slots, e.g. SLIV {2-0, 2-1}. the fourth row has single SLIV, e.g. SLIV {3-0}. There are in total 8 pairs ($d_{k,j}$,r), e.g. pair ($d_{1,0}$, 0), ($d_{1,0}$, 1), ($d_{1,0}$, 2), ($d_{1,0}$, 3), ($d_{0,0}$, 0), ($d_{0,0}$, 1), ($d_{0,0}$, 2), ($d_{0,0}$, 3). The 8 pairs can be divided into 2 groups.

The first group includes 6 pairs ($d_{1,0}$, 0), ($d_{1,0}$, 1), ($d_{1,0}$, 3), ($d_{0,0}$, 0), ($d_{0,0}$, 1), ($d_{0,0}$, 3). With this scheme, 5 occasions could be allocated for the first group.

The second group includes pairs ($d_{1,0}$, 2), ($d_{0,0}$, 2). With this scheme, 2 occasions could be allocated for the first group.

Therefore, the Type1 HARQ-ACK codebook consists of 7 occasions.

Handling DCI Format 1_0 in Type1 HARQ-ACK Codebook

In one embodiment, with Type1 HARQ-ACK codebook, the set of K1 is extended considering multiple PDSCHs can be scheduled by a DCI in multiple consecutive slots, and a DCI format 1_0 can be used to schedule PDSCH transmission with a value $K_{1,k}$ which belongs to the intersection of the set of slot timing values for DCI format 1_0, e.g. {1, 2, 3, 4, 5, 6, 7, 8} in NR, and the extended set of K1.

For example, in FIG. 4, if set of K1 is considered, the applicable slot timing values for DCI format 10 is {2, 3, 5}. On the other hand, if extended set of K1 is considered, the applicable lot timing values for DCI format 1_0 is {2, 3, 4, 5, 6, 7, 8}.

Various embodiments herein provide techniques for HARQ-ACK transmission assuming multiple PDSCHs can be scheduled by a DCI. Embodiments include techniques to generate a semi-static HARQ-ACK codebook for multi-PDSCH scheduling in system operating above 52.6 GHz carrier frequency, considering potential limitation on the multi-PDSCH scheduling for codebook size reduction.

A DCI may be able to schedule one or more PDSCHs with separate TBs. The number of scheduled PDSCHs by the DCI may be explicitly indicated by a field in the DCI. Alternatively, the number of scheduled PDSCHs by the DCI is jointly coded with other information field(s). For example, the number of scheduled PDSCHs for a row in a time domain resource allocation (TDRA) table equals to the number of configured SLIVs of the row. The maximum number of PDSCHs scheduled by a multi-TTI DCI is the maximum number of scheduled PDSCHs among all rows. For a row of TDRA table, each SLIV can be configured in a different slot. Alternatively, one or more SLIVs may be configured in the same slot.

For the Type1 HARQ-ACK codebook in NR, a set of occasions for candidate PDSCH reception are determined based on the configured set of slot timing values K1, the configured TDD UL-DL configurations (e.g. TDD UL-DL configurationCommon and TDD UL-DL configurationDedicated) and the time domain resource allocation (e.g. SLIV) table(s). Depending on UE capability, the number of occasions for a slot associated with a value n-K1 is either up to 1 or determined by non-overlapped SLIVs in the slot.

Type1 HARQ-ACK codebook could be extended to support HARQ-ACK feedback for the multiple PDSCHs scheduled by a multi-PDSCH DCI. It is necessary to include the HARQ-ACK bit(s) for all the potential PDSCHs indicated by the SLIVs of a row in the TDRA table. On the other hand, multiple limitation factors on the multi-PDSCH scheduling can be used to reduce the codebook size.

The PDSCH Transmissions Scheduled by Different DCI are not Interleaved

For the multi-PDSCH scheduling, the timing relation between the PDCCHs and the scheduled PDSCHs can be defined in the following way: in a given scheduled cell, the UE is not expected that, a first PDSCH, that is scheduled with a second PDCCH, starts earlier than the end of the last PDSCH that is scheduled by a first PDCCH, and a first PDSCH, that is scheduled with the first PDCCH, starts earlier than the end of the last PDSCH that is scheduled by the second PDCCH. By this way, the PDSCH(s) scheduled by a first DCI cannot be interleaved with the PDSCH(s) scheduled by a second DCI.

Figure 12:
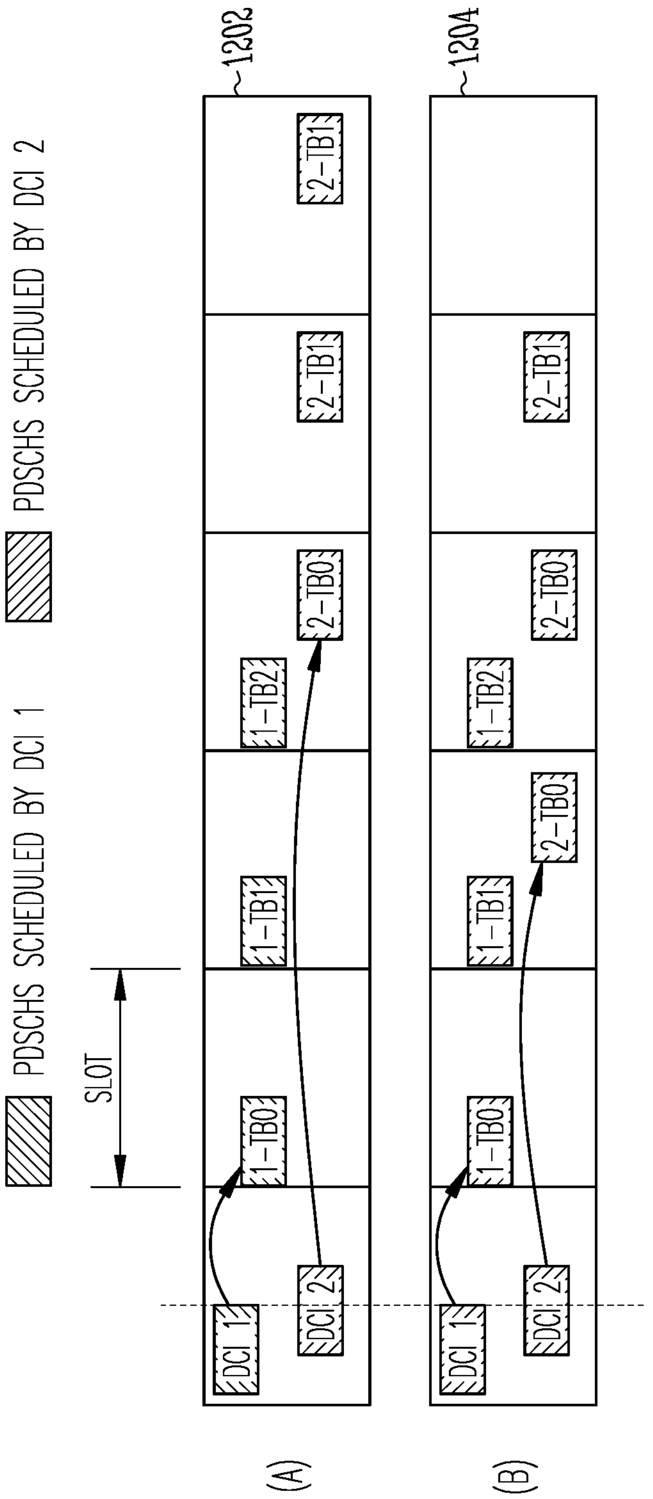
FIG. 12 illustrates timing relations between physical downlink control channels (PDCCHs) and PDSCHs, in accordance with some embodiments.

FIG. 12 illustrates one example for the valid and invalid multi-PDSCH scheduling by two PDCCHs. Based on the above timing relation 1202 is considered as valid scheduling, while timing relation 1204 is invalid scheduling.

Corresponding to a value $K_{1,k}$ in the set of K1, one or more ending DL slots for the PDSCH transmissions can be determined. For the HARQ-ACK transmission in UL slot $n_U$ and value $K_{1,k}$, PDSCH transmission(s) can be ended in DL slots $\lfloor n_U - K_{1,k}) \cdot 2^{\mu_{DL}-\mu_{DL}} \rfloor + j$, j=0, 1, . . . , $\lceil 2^{\mu_{DL}-\mu_{UL}} \rceil - 1$. Then, the set of the DL slots that can be used for PDSCH transmissions can be determined by all the determined ending DL slots corresponding to all the values in the set of K1. The occasions for candidate PDSCH receptions can be allocated for each determined DL slot respectively and concatenated.

set of pairs $(d_{k,j}, r)$ can be determined for each DL slot that is determined by a value $K_{1,k}$ in the set of K1. A pair $(d_{k,j}, r)$ indicates the PDSCH transmissions that can be scheduled by a DCI indicating a row r in TDRA table and value $K_{1,k}$ and ends in DL slot $\lfloor n_U - K_{1,k}) \cdot 2^{\mu_{DL}-\mu_{DL}} \rfloor + j$. For HARQ-ACK transmission in slot $n_U$, the corresponding set of pairs for a determined DL slot only include a pair $(d_{k,j}, r)$ if at least one of the PDSCH transmissions that are associated with the pair $(d_{k,j}, r)$ is mapped to the determined DL slot. The set of pairs for a determined DL slot may be further limited to only include a pair $(d_{k,j}, r)$ if the pair contains a SLIV that is mapped to the determined DL slot and is not overlapped with any UL symbol in the determined DL slot according to the semi-static TDD UL-DL configuration, if configured.

FIG. 11 illustrates one example of the configuration of set of K1 and set of rows in TDRA table. It assumes that the SCS for PUCCH transmission and the PDSCH transmission is the same. In this example, the set of K1 have 2 values 2 and 3. The TDRA table include 4 rows. The first row has 5 SLIVs which are allocated in 4 consecutive slots, e.g. SLIV {0-0, 0-1, 0-2, 0-3, 0-4}. The second row has 3 SLIVs in three consecutive slots, e.g. SLIV {1-0, 1-1, 1-2}. The third row has 2 SLIVs in two consecutive slots, e.g. SLIV {2-0, 2-1}. the fourth row has single SLIV, e.g. SLIV {3-0}. Corresponding to HARQ-ACK transmission in slot n, the ending DL slots that are determined by the set of K1 is slot n-3 and n-2. All the DL slots for PDSCH transmission are from slot n-6 to slot n-2.

In one embodiment, for a determined non-ending slot, the number of allocated occasions equals to the maximum number of SLIV(s) that are available for PDSCH transmission in the determined non-ending DL slot among all the pairs of the determined non-ending DL slot. A SLIV in a slot is considered available for PDSCH transmission if the SLIV is not overlapped with any UL symbol in the slot according to the semi-static TDD UL-DL configuration, if configured.

In FIG. 11, the number of occasions that are allocated for the determined non-ending DL slot n-6, n-5, n-4 are 1, 1, 2 respectively.

Specifically, if only one SLIV can be configured in a slot for each row in the TDRA table, one occasion can be allocated for a determined non-ending slot, if at least one SLIV from the set of pairs $(d_{k,j}, r)$ for the determined non-ending slot is available for PDSCH transmission in the determined non-ending slot. Otherwise, no occasion is allocated for the determined non-ending slot.

In one embodiment, based on the set of pairs $(d_{k,j}, r)$ for a determined ending slot, a set of SLIVs that indicate PDSCH transmissions in the determined ending slot are obtained. For example, in FIG. 11, the set of SLIVs for slot n-3 include SLIV 0-2, 0-3, 1-1, 2-0, 0-4, 1-2, 2-1 and 3-0. Then, the occasions can be generated by the set of determined DL slots, the corresponding set of SLIVs for each determined DL slot and the semi-static TDD UL-DL configuration. The existing procedure for Type1 HARQ-ACK codebook generation in NR can be reused to generate occasions for each DL slot assuming the corresponding set of SLIVs of the DL slot.

In one embodiment, based on the set of pairs $(d_{k,j}, r)$ for a determined ending slot, a set of SLIVs that are available for PDSCH transmissions in the determined ending slot are obtained according to the semi-static TDD UL-DL configuration. A SLIV in a slot is considered available for PDSCH transmission if the SLIV is not overlapped with any UL symbol in the slot according to the semi-static TDD UL-DL configuration, if configured. Then, the occasions can be generated by the set of determined DL slots, the corresponding set of SLIVs for each determined DL slot. The existing procedure for Type1 HARQ-ACK codebook generation in NR can be reused to generate occasions for each DL slot assuming the corresponding set of SLIVs of the DL slot.

In one embodiment, for a determined ending slot, the set of pairs $(d_{k,j}, r)$ are divided into one or multiple groups. Then, the occasion(s) are allocated for each group of pairs respectively. For any two pairs in a group, at least one SLIV of a first pair is overlapped with the SLIV(s) of a second pair.

The pairs for a determined ending slot can be categorized into 4 types:

Type1 pair: a pair that is configured in multiple slots and ends in the determined ending DL slot. For example, pair $(d_{0,0}, 0)$, $(d_{0,0}, 1)$, $(d_{0,0}, 2)$ for slot n-3 in FIG. 11.

Type2 pair: a pair that is configured in multiple slots and starts from the determined ending DL slot. For example, pair $(d_{1,0}, 2)$ for slot n-3 in FIG. 11.

Type3 pair: a pair starts in a slot before the determined ending DL slot and ends in a slot after the determined ending DL slot. For example, pair $(d_{1,0}, 0)$, $(d_{1,0}, 1)$ for slot n-3 in FIG. 11.

Type4 pair: a pair that is only configured in the determined ending DL slot. For example, pair $(d_{0,0}, 3)$ for slot n-3 in FIG. 11.

One or more of the following principles can be considered in the grouping of pairs in a determined ending DL slot:

All overlapped pairs can share the same occasion(s)

All Type1 pairs can share the same occasion(s)

All Type2 pairs can share the same occasion(s)

All Type3 pairs can share the same occasion(s) and can share the occasions with any other types of pairs If the ending OFDM symbol index of a Type1 pair in the determined ending DL slot is not earlier than the starting OFDM symbol index of a Type4 pair, the Type1 pair and the Type4 pair can share the same occasion(s)

If the starting OFDM symbol index of a Type2 pair in the determined ending DL slot is not later than the ending OFDM symbol index of a Type4 pair, the Type2 pair and the Type4 pair can share the same occasion(s)

If the ending OFDM symbol index of a Type1 pair in the determined ending DL slot is not earlier than the starting OFDM symbol index of a Type2 pair in the determined ending DL slot, the Type1 pair and the Type2 pair can share the same occasion(s)

In FIG. 11, based on the above principles, the number of occasions that are allocated for the determined non-ending DL slot n-3, n-2 can be 3, 2 respectively.

In one option, if at most one SLIV can be configured in a slot for each row in the TDRA table, a pair belongs to only one group. One occasion can be allocated for a group, if at least one SLIV from the group of pairs for the determined ending slot is available for PDSCH transmission in the determined ending slot. Otherwise, no occasion is allocated for the group.

In one option, a pair only belongs to a group. For the determined ending DL slot, the occasion(s) are allocated for each group of pairs respectively. For a group, the number of allocated occasions equals to the maximum number of SLIV(s) that is available for PDSCH transmission in the determined ending DL slot among all the pairs in the group.

In another option, if a pair contains N SLIVs that are available for PDSCH transmissions in the determined ending DL slot, the pair is treated as N pairs which respectively contain the N SLIVs in the determined ending DL slot, N≥1. The SLIVs in slots other than the determined ending DL slot for the pair commonly apply to the N pairs. Consequently, the pair belongs to N groups. For the determined ending DL slot, one occasion is allocated for each group of pairs respectively. For the pair containing N SLIVs in the determined ending DL slot, the N occasions determined for the N groups are respectively used to carry HARQ-ACK of the N SLIVs.

In another option, if a pair contains N SLIVs that are available for PDSCH transmissions in the determined ending DL slot, the pair is grouped into N groups which are respectively used to allocate the occasions for the N SLIVs, N≥1. To check the overlap between the pair with N SLIVs and another pair, all the N SLIVs can be considered. For the determined ending DL slot, one occasion is allocated for each group of pairs respectively. For the pair containing N SLIVs in the determined ending DL slot, the N occasions determined for the N groups are respectively used to carry HARQ-ACK of the N SLIVs.

In the above options, the UE can iteratively do the following procedure until all pairs in the set of pairs are grouped for a determined ending slot. To generate a group of pairs, a pair with smallest last OFDM symbol index in the determined ending DL slot among all remaining pairs is determined and added to the group. Then any pair that overlaps with all pairs in the group is added to the group.

In the above options, the UE can iteratively do the following procedure until all pairs in the set of pairs are grouped.

Step 1: a pair with smallest last OFDM symbol index in the determined ending DL slot among all remaining pairs is determined and is used to generate a group. The following rules are used to do the grouping, A Type1 pair is considered overlap with all other pairs and is added to the group A pair that overlap with all pairs in the group is added to the group Step 2: a pair with largest start OFDM symbol index in the determined ending DL slot among all remaining pairs is determined and is used to generate a group. The following rules are used to do the grouping, A Type2 pair is considered overlap with all other pairs and is added to the group A pair that overlap with all pairs in the group In the above options, the UE can iteratively do the following procedure until all pairs in the set of pairs are grouped.

Step 1: a pair with smallest last OFDM symbol index in the determined ending DL slot among all remaining pairs is determined and is used to generate a group. The following rules are used to do the grouping, A Type1 pair is considered overlap with all other pairs and is added to the group A Type3 pair is considered overlap with all other pairs and is added to the group A pair that overlap with all pairs in the group is added to the group Step 2: a pair with largest start OFDM symbol index in the determined ending DL slot among all remaining pairs is determined and is used to generate a group. The following rules are used to do the grouping, A Type2 pair is considered overlap with all other pairs and is added to the group A Type3 pair is considered overlap with all other pairs and is added to the group A pair that overlap with all pairs in the group In the above options, the UE can iteratively do the following procedure until all pairs in the set of pairs are grouped.

Step 1: a pair with smallest last OFDM symbol index m in the determined ending DL slot is determined among all remaining Type1/3/4 pairs and is used to generate a group. The following rules are used to do the grouping, A Type1 pair is considered overlap with all other pairs and is added to the group A Type3 pair is considered overlap with all other pairs and is added to the group A pair that overlap with all pairs in the group is added to the group For a Type2 pair, if the first OFDM symbol index of the pair in the determined ending DL slot is not larger than m, the pair is considered overlap with all other pairs and is added to the group Step 2: a pair with largest start OFDM symbol index m in the determined ending DL slot is determined among all remaining Type2/3/4 pairs and is used to generate a group. The following rules are used to do the grouping, A Type2 pair is considered overlap with all other pairs and is added to the group A Type3 pair is considered overlap with all other pairs and is added to the group A pair that overlap with all pairs in the group For a Type1 pair, if the last OFDM symbol index of the pair in the determined ending DL slot is not less than m, the pair is considered overlap with all other pairs and is added to the group In the above options, the UE can group the set of pairs using the following procedure.

- Step 1: a pair with smallest last OFDM symbol index m in the determined ending DL slot is determined among all remaining Type1 or Type4 pairs and is used to generate a group. The following rules are used to do the grouping,
- A Type1 pair is added to the group
- A Type3 pair is added to the group
- For a Type4 pair, if the first symbol index of the pair in the determined ending DL slot is not larger than m, the pair is added to the group
- For a Type2 pair, if the first symbol index of the pair in the determined ending DL slot is not larger than m, the pair is added to the group
- Step 2: a pair with largest start OFDM symbol index m in the determined ending DL slot is determined among all remaining Type2 or Type4 pairs and is used to generate a group. The following rules are used to do the grouping,
- A Type2 pair is added to the group
- A Type3 pair is added to the group
- For a Type4 pair, if the last OFDM symbol index of the pair in the determined ending DL slot is not less than m, the pair is added to the group
- Step 3: the remaining pairs in Step 3, if existed, are Type3 or Type4 pairs.
- If the remaining pairs are Type3 pairs. All remaining Type3 pairs belong to one group.
- Otherwise, the UE can iteratively run the following procedure until all remaining Type4 pairs are grouped.
- a pair with smallest last OFDM symbol index m in the determined ending DL slot is determined among all remaining Type4 pairs and is used to generate a group. For a Type4 pair, if the first symbol index of the pair in the determined ending DL slot is not larger than m, the pair is added to the group At Most One PDSCH can be Scheduled in a Slot For the multi-PDSCH scheduling, a UE may support at most one scheduled PDSCH in a slot. Such rule can be used for Type1 HARQ-ACK codebook size reduction.

Corresponding to a value $K_{1,k}$ in the set of K1, one or more ending DL slots for the PDSCH transmissions can be determined. For the HARQ-ACK transmission in UL slot $n_U$ and value $K_{1,k}$, PDSCH transmission(s) can be ended in DL slots $\lfloor n_U - K_{1,k}) \cdot 2^{\mu_{DL}-\mu_{DL}} \rfloor + j$, j=0, 1, . . . , $\lceil 2^{\mu_{DL}-\mu_{DL}} \rceil - 1$. Then, the set of the DL slots that can be used for PDSCH transmissions can be determined by all the determined ending DL slots corresponding to all the values in the set of K1. Up to one occasion for candidate PDSCH reception can be allocated for each determined DL slot respectively and concatenated.

A set of pairs ($d_{k,j}$,r $d_{k,j}$,r) can be determined for each DL slot that is determined by a value $K_{1,k}$ $K_{1,k}$ in the set of K1. A pair ($d_{k,j}$,r $d_{k,j}$,r) indicates the PDSCH transmissions that can be scheduled by a DCI indicating a row r in TDRA table and value $K_{1,k}$ $K_{1,k}$ and ends in DL slot $\lfloor n_U - K_{1,k}) \cdot 2^{\mu_{DL}-\mu_{DL}} \rfloor + j \lfloor n_U - K_{1,k}) \cdot 2^{\mu_{UL}} \rfloor$. For HARQ-ACK transmission in slot $n_U$ $n_U$, the corresponding set of pairs for a determined DL slot only include a pair ($d_{k,j}$,r $d_{k,j}$,r) if at least one of the PDSCH transmissions that are associated with the pair ($d_{k,j}$,r $d_{k,j}$,r) ($d_{k,j}$,r $d_{k,j}$,r) is mapped to the determined DL slot. One occasion can be allocated for a determined DL slot, if at least one SLIV from the set of pairs ($d_{k,j}$,r $d_{k,j}$,r) ($d_{k,j}$,r $d_{k,j}$,r) for the determined DL slot is available for PDSCH transmission in the determined DL slot. Otherwise, no occasion is allocated for the determined DL slot.

The set of pairs for a determined DL slot may be further limited to only include a pair ($d_{k,j}$,r $d_{k,j}$,r) if the pair contains a SLIV that is mapped to the determined DL slot and is not overlapped with any UL symbol in the determined DL slot according to the semi-static TDD UL-DL configuration, if configured. For a determined DL slot, if there is at least one pair in the set of pairs for the determined DL slot, one occasion is allocated for the determined DL slot. Otherwise, no occasion is allocated for the determined DL slot.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus for a user equipment (UE) configured for operation in a 5th generation (5G) new radio (NR) network, the apparatus comprising: processing circuitry; and memory, wherein the processing circuitry is configured to:

detect a downlink control information (DCI) format scheduling a multi-physical downlink shared channel (MultiPDSCH); and determine, based on a time domain resource assignment field value in the DCI format, a resource allocation in time-domain to receive the MultiPDSCH, the resource allocation determined from indexed rows in a resource allocation table, each of the indexed rows defining a slot offset and a Start and Length Indicator Value (SLIV), wherein for the MultiPDSCH, one or more of the indexed rows contain more than one SLIV, wherein when the UE is configured for Type-1 HARQ-ACK codebook determination, the processing circuitry is configured to:

determine candidate PDSCH reception occasions for transmission of corresponding Hybrid Automatic Repeat RequestAcknowledgement (HARQ-ACK) information in a physical uplink control channel (PUCCH) in an uplink slot, the candidate PDSCH reception occasions being within one or more downlink slots that include the resource allocation for reception of the MultiPDSCH; and encode the HARQ-ACK information for transmission in the uplink slot, the HARQ-ACK information comprising a Type-1 HARQ-ACK codebook generated based on reception of the MultiPDSCH in one or more of the candidate PDSCH reception occasions, wherein the MultiPDSCH is scheduled by the DCI format in either consecutive or non-consecutive of the downlink slots based on the time domain resource assignment field value, wherein when operating at carrier frequencies above 52.6 GHz (FR2-2), the UE is configured to detect the DCI format scheduling the MultiPDSCH for subcarrier spacings (SCS) of 120 kHz, 480 kHz and 960 kHz, and wherein the memory is configured to store the DCI format.

2. The apparatus of claim 1, wherein to determine the resource allocation for reception of the MultiPDSCH, the processing circuitry is to consider combinations of start symbol and allocation length for the indexed rows of the resource allocation table.

3. The apparatus of claim 2, wherein the processing circuitry is configured to decode the MultiPDSCH in the candidate PDSCH reception occasions to generate the Type-1 HARQ-ACK codebook.

4. The apparatus of claim 3, wherein the indexed rows of the resource allocation table indicate the start symbol and the allocation length.

5. The apparatus of claim 4, wherein the processing circuitry is configured to exclude one or more of the candidate PDSCH reception occasions when one of the downlink slots for a candidate PDSCH reception occasion overlaps with the uplink slot.

6. The apparatus of claim 5, wherein the candidate PDSCH reception occasions correspond to locations in the Type-1 HARQ-ACK codebook.

7. The apparatus of claim 6, wherein the MultiPDSCH comprises more than one transport block (TB).

8. A non-transitory computer-readable storage medium that stores instructions for execution by processing circuitry of a user equipment (UE) configured for operation in a 5th generation (5G) new radio (NR) network, wherein the processing circuitry is configured to: detect a downlink control information (DCI) format scheduling a multi-physical downlink shared channel (MultiPDSCH); and determine, based on a time domain resource assignment field value in the DCI format, a resource allocation in time-domain to receive the MultiPDSCH, the resource allocation determined from indexed rows in a resource allocation table, each of the indexed rows defining a slot offset and a Start and Length Indicator Value (SLIV), wherein for the MultiPDSCH, one or more of the indexed rows contain more than one SLIV, wherein when the UE is configured for Type-1 HARQ-ACK codebook determination, the processing circuitry is configured to:

determine candidate PDSCH reception occasions for transmission of corresponding Hybrid Automatic Repeat Request Acknowledgement (HARQ-ACK) information in a physical uplink control channel (PUCCH) in an uplink slot, the candidate PDSCH reception occasions being within one or more downlink slots that include the resource allocation for reception of the MultiPDSCH; and encode the HARQ-ACK information for transmission in the uplink slot, the HARQ-ACK information comprising a Type-1 HARQ-ACK codebook generated based on reception of the MultiPDSCH in one or more of the candidate PDSCH reception occasions, wherein the MultiPDSCH is scheduled by the DCI format in either consecutive or non-consecutive of the downlink slots based on the time domain resource assignment field value, wherein when operating at carrier frequencies above 52.6 GHz (FR2-2), the UE is configured to detect the DCI format scheduling the MultiPDSCH for subcarrier spacings (SCS) of 120 kHz, 480 kHz and 960 kHz, and wherein memory is configured to store the DCI format.

9. The non-transitory computer-readable storage medium of claim 8, wherein to determine the resource allocation for reception of the MultiPDSCH, the processing circuitry is to consider combinations of start symbol and allocation length for the indexed rows of the resource allocation table.

10. The non-transitory computer-readable storage medium of claim 9, wherein the processing circuitry is configured to decode the MultiPDSCH in the candidate PDSCH reception occasions to generate the Type-1 HARQ-ACK codebook.

11. The non-transitory computer-readable storage medium of claim 10, wherein the indexed rows of the resource allocation table indicate the start symbol and the allocation length.

12. The non-transitory computer-readable storage medium of claim 11, wherein the processing circuitry is configured to exclude one or more of the candidate PDSCH reception occasions when one of the downlink slots for a candidate PDSCH reception occasion overlaps with the uplink slot.

13. An apparatus for a gNodeB (gNB) configured for operation in a 5th generation (5G) new radio (NR) network, the apparatus comprising: processing circuitry; and memory, wherein the processing circuitry is configured to:

encode a downlink control information (DCI) format for transmission to a user equipment (UE), the DCI format scheduling a multi-physical downlink shared channel (MultiPDSCH); and determine, based on a time domain resource assignment field value in the DCI format, a resource allocation in time-domain to transmit the MultiPDSCH, the resource allocation determined from indexed rows in a resource allocation table, each of the indexed rows defining a slot offset and a Start and Length Indicator Value (SLIV), wherein for the MultiPDSCH, one or more of the indexed rows contain more than one SLIV, wherein when the UE is configured for Type-1 HARQ-ACK codebook determination, the processing circuitry is configured to:

determine candidate PDSCH reception occasions for which the UE is expected to transmit corresponding Hybrid Automatic Repeat Request Acknowledgement (HARQ-ACK) information in a physical uplink control channel (PUCCH) in an uplink slot, the candidate PDSCH reception occasions being within one or more downlink slots that include the resource allocation for reception of the MultiPDSCH; and decode the HARQ-ACK information received from the UE in the uplink slot, the HARQ-ACK information comprising a Type-1 HARQ-ACK codebook generated by the UE based on reception of the MultiPDSCH in one or more of the candidate PDSCH reception occasions, wherein when operating at carrier frequencies above 52.6 GHz (FR2-2), the DCI format is configured to schedule the MultiPDSCH for subcarrier spacings (SCS) of 120 kHz, 480 kHz and 960 kHz, wherein the memory is configured to store the DCI format.

* * * * *